United States Patent [19]
Tounai et al.

[11] Patent Number: 5,870,382
[45] Date of Patent: *Feb. 9, 1999

[54] AUTOMATIC PROTECTION SWITCHING SYSTEM FOR ATM EXCHANGE NETWORK

[75] Inventors: Shunichi Tounai; Yoshiyuki Karakawa, both of Hakata, Japan

[73] Assignee: Fujitsu Limited, Kanagawa, Japan

[ * ] Notice: The term of this patent shall not extend beyond the expiration date of Pat. No. 5,663,949.

[21] Appl. No.: 680,785

[22] Filed: Jul. 16, 1996

[30] Foreign Application Priority Data

Sep. 4, 1995 [JP] Japan ................................ 7-226313

[51] Int. Cl.⁶ .................................. A04J 1/16; H04L 1/00; H04B 3/38
[52] U.S. Cl. .......................... 370/220; 370/217; 370/219; 370/228; 340/825.01; 340/827
[58] Field of Search ..................................... 370/217, 218, 370/219, 220, 228; 340/825.01, 827

[56] References Cited

U.S. PATENT DOCUMENTS 5,285,441  2/1994  Bansal et al. .......................... 370/218
5,315,581  5/1994  Nakano et al. ......................... 370/218
5,627,822  5/1997  Edmaier et al. ........................ 370/218
5,663,949  9/1997  Ishibashi et al. ....................... 370/220

FOREIGN PATENT DOCUMENTS 4192935  7/1992  Japan .

*Primary Examiner*—Chi H. Pham
*Assistant Examiner*—W. Todd Baker
*Attorney, Agent, or Firm*—Helfgott & Karas, P C.

[57] ABSTRACT

An ATM exchange network system in which a first equipment and a second equipment are connected through a duplex communication line comprising a working line and a protection line. In this system, each of the first equipment and second equipment provides: a bridging unit which bridges the working line and the protection line on the transmission side; a switch for selecting the working line or the protection line on the reception side; a K-byte generating function for generating byte information containing information for realizing the APS; a function of receiving the K byte information from the protection line, analyzing the received information, placing the prescribed information in the K byte and realizing the APS; and a function of changing over the switch. Thus, the reliability with respect to a line failure in the ATM exchange network can be improved.

22 Claims, 38 Drawing Sheets

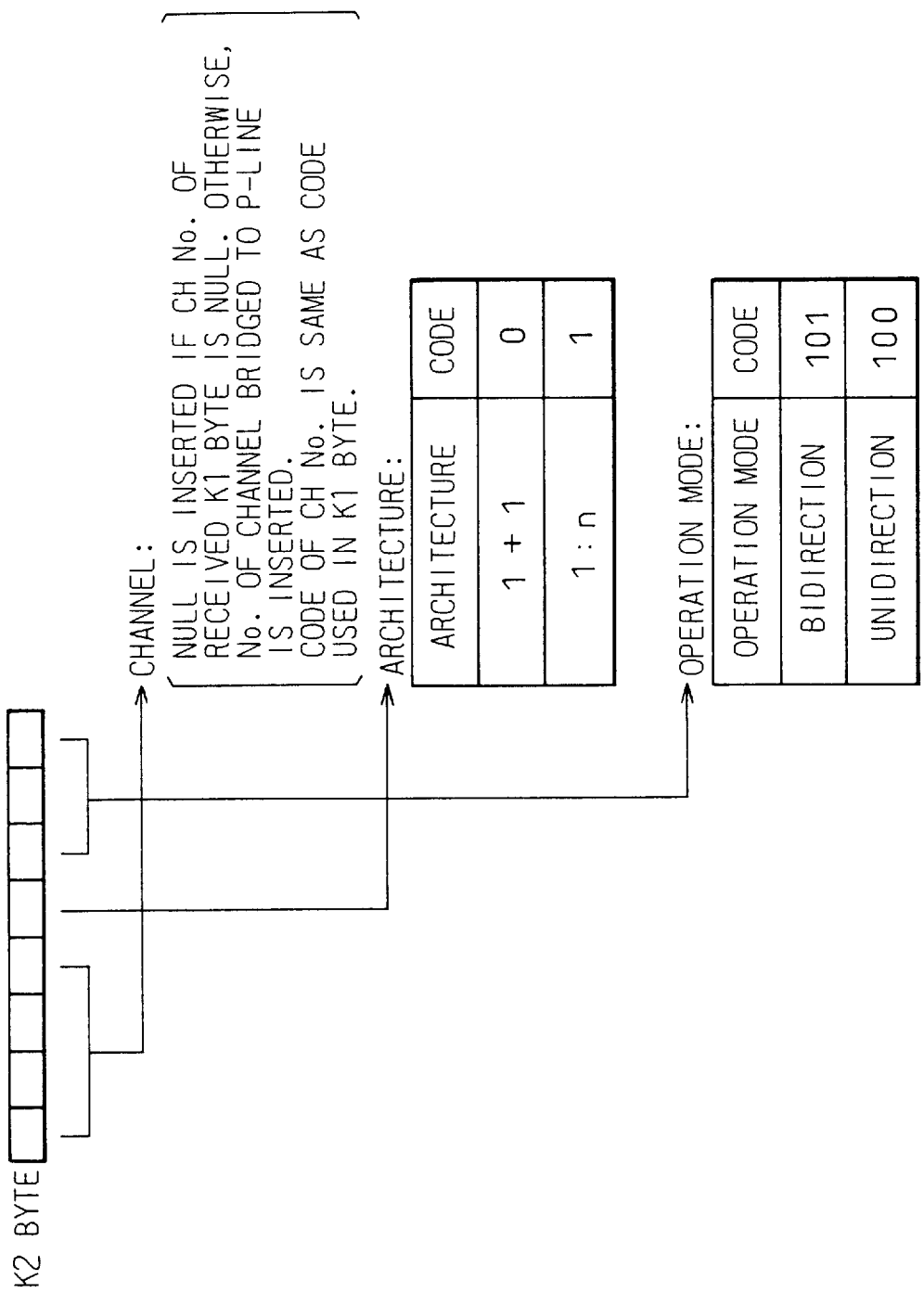

Fig.4

| PRIORITY | CODES | MEANING |
|---|---|---|
| HIGH ↑↓ LOW | 1111 | LOCKOUT OF PROTECTION |
| | 1110 | FORCED SWITCH |
| | 1101 | SF-HIGH PRIORITY (*1) |
| | 1100 | SF-LOW PRIORITY |
| | 1011 | SD-HIGH PRIORITY (*1) |
| | 1010 | SD-LOW PRIORITY |
| | 1001 | (NOT USED) |
| | 1000 | MANUAL SWITCH |
| | 0111 | (NOT USED) |
| | 0110 | WAIT-TO-RESTORE (*2) |
| | 0101 | (NOT USED) |
| | 0100 | EXERCISE (*3) |
| | 0011 | (NOT USED) |
| | 0010 | REVERCE REQUEST (*4) |
| | 0001 | DO NOT REVERT (*5) |
| | 0000 | NO REQUEST |

*1: HIGH PRIORITY IS ADOPTED ONLY TO 1:n
*2: WTR IS NOT TRANSMITTED UNDER 1+1 AND NON-REVERTIVE
*3: EXERCISE IS NOT SUPPORTED
*4: ADOPTED ONLY TO BIDIRECTIONAL
*5: DO NOT REVERT IS TRANSMITTED ONLY UNDER 1+1 AND NON-REVERTIVE

Fig. 5

| COMMANDS | OPERATIONS |
|---|---|
| CLEAR | FOLLOWING COMMANDS ARE CLEARED |
| LOCKOUT OF PROTECTION | SWITCHING TO P-LINE IS INHIBITED. STATE IS SWITCHED BACK TO W-LINE, IF STATE HAS BEEN SWITCHED TO P-LINE. |
| FORCED SWITCH OF WORKING (TO P) | IF IT IS NOT FOLLOWING STATE, STATE IS SWITCHED TO P-LINE. -LOCKOUT OF PROTECTION, SF ON P-LINE AND OTHER FORCED SWITCH ARE VALID. |
| FORCED SWITCH OF PROTECTION (TO W) | STATE IS SWITCHED BACK TO W-LINE, IF OTHER FORCED SWITCH IS NOT VALID. IT IS ISSUED AS FORCED SWITCH OF CH 0. (USED ONLY UNDER 1+1) |
| MANUAL SWITCH OF WORKING (TO P) | IF REQUEST OF SAME PRIORITY OR HIGHER PRIORITY IS NOT VALID, STATE IS SWITCHED TO P-LINE. ORDINARY CHANNEL SWITCHING. |
| MANUAL SWITCH OF PROTECTION (TO W) | IF REQUEST OF SAME PRIORITY OR HIGHER PRIORITY IS NOT VALID, STATE IS SWITCHED BACK TO W-LINE. IT IS ISSUED AS MANUAL SWITCH OF CH 0. (USED ONLY UNDER 1+1) |
| EXERCISE | OMITTED (NOT SUPPORTED) |

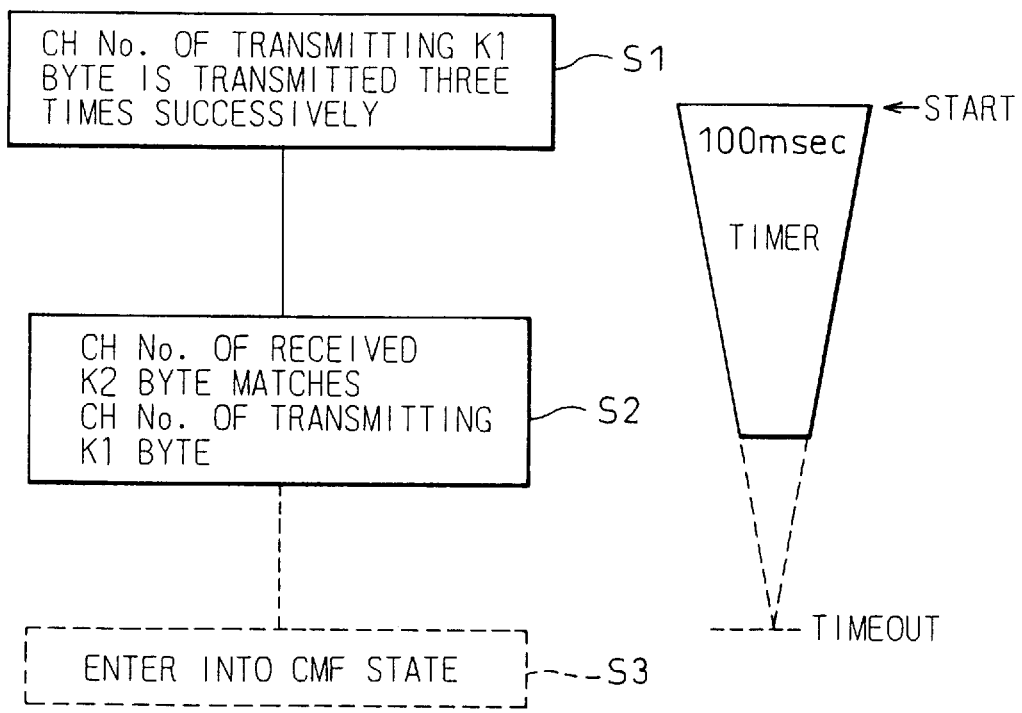

CONNECTION BETWEEN
HOST AND BRLC

CONNECTION BETWEEN
TWO OFFICES

Fig.8

| BER | MAXIMUL VALUE | TARGET VALUE |
|---|---|---|
| $10^{-3}$ | 10 ms | 8 ms |
| $10^{-4}$ | 100 ms | 13 ms |
| $10^{-5}$ | 1 s | 100 ms |
| $10^{-6}$ | 10 s | 1 s |
| $10^{-7}$ | 100 s | 10 s |
| $10^{-8}$ | 1000 s | 83 s |
| $10^{-9}$ | 10000 s | 666 s |

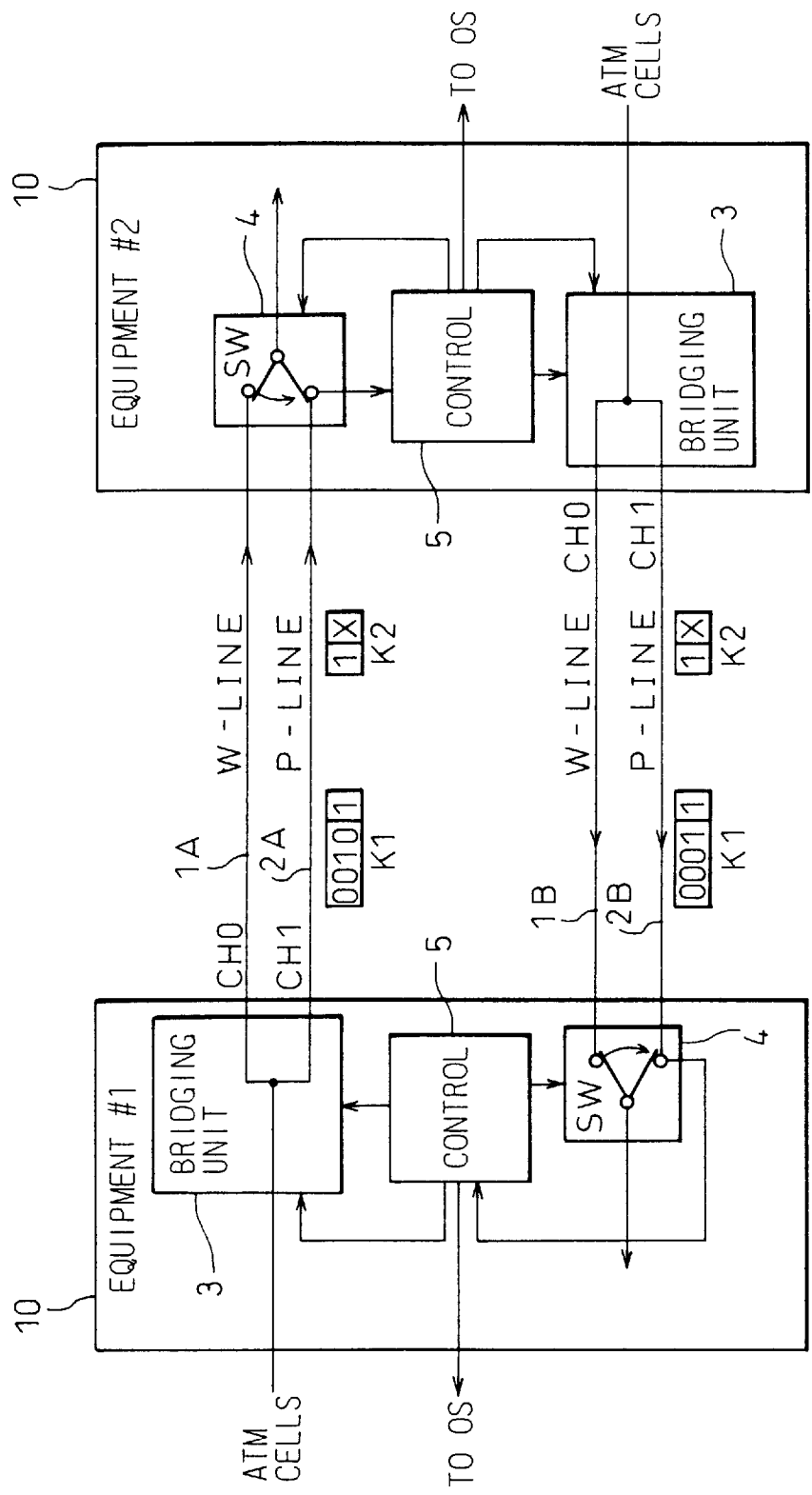

Fig. 12

| NAME OF PACKAGE | DRAWING NUMBER | FUNCTION |
|---|---|---|
| HSF01A | E16B-2905-R230 | SHELF COMMON CONTROLLER |
| HMX04A | E16B-2905-R240 | SHELF COMMON UP HIGHWAY MULTIPLEXER |
| HMX05A | E16B-2905-R250 | SHELF COMMON DOWN HIGHWAY DEMULTIPLEXER A |
| HMX06A | E16B-2905-R260 | SHELF COMMON DOWN HIGHWAY DEMULTIPLEXER B |
| HPT01A | E16B-2905-R320 | -48V POWER SUPPLY |

Fig.15

| | | HPT014 |
|---|---|---|
| INDIVIDUAL PART | #7 | C |
| | | B |
| | | A |
| | | ABC |
| | #6 | C |
| | | B |
| | | A |
| | #5 | C |
| | | B |
| | | A |
| | #4 | C |
| | | B |
| | | A |
| COMMON PART 1 SIDE | | HSF014 |
| | | HMMX044 |
| | | HMMX064 |
| | | HMMX066 |
| 0 SIDE | | HMMX066 |
| | | HMMX054 |
| | | HMX044 |
| | | HSF014 |
| INDIVIDUAL PART | #3 | C |
| | | B |
| | | A |
| | #2 | C |
| | | B |
| | | A |
| | #1 | C |
| | | B |
| | | A |
| | #0 | C |
| | | B |
| | | A |
| | | HPT014 |

(Note: table reconstruction approximate; original is a vertical frame structure diagram)

Fig. 18

| | RECEIVED VPI /VCI NUMBER | | USE | TRANSMITTING VPI /VCI NUMBER | |
|---|---|---|---|---|---|
| | VPI(H) | VCI(H) | | VPI(H) | VCI(H) |
| ⟨1⟩ | 00 | 3FC | SIFCOM#0 SIDE INTRA-OFFICE COMMUNICATION FOR 0-CHANNEL | AA<br><br>BSGC CARD No. | 000 ~ 3FF<br><br>BSGC PORT No. |
| ⟨2⟩ | 00 | 3FD | SIFCOM#1 SIDE INTRA-OFFICE COMMUNICATION FOR 0-CHANNEL | | |
| ⟨3⟩ | 00 | 3FE | HOST OC3c INTRA-OFFICE COMMUNICATION FOR WORKING | 3F | 3FE |
| ⟨4⟩ | 00 | 3F9 | HOST OC3c INTRA-OFFICE COMMUNICATION FOR PROTECTION | 3F | 3F9 |
| ⟨5⟩ | 3F | 3F0 | RMXCOM#0 SIDE INTRA-OFFICE COMMUNICATION FOR 0-CHANNEL | 3F | 3F0 |
| ⟨6⟩ | 3F | 3F2 | RMXCOM#0 SIDE INTRA-OFFICE COMMUNICATION FOR 1-CHANNEL | SAME FOR 0-CHANNEL, BUT NO COMMUNICATION AFTER "APS" | |
| ⟨7⟩ | 3F | 3F1 | RMXCOM#1 SIDE INTRA-OFFICE COMMUNICATION FOR 0-CHANNEL | 3F | 3F1 |
| ⟨8⟩ | 3F | 3F3 | RMXCOM#1 SIDE INTRA-OFFICE COMMUNICATION FOR 1-CHANNEL | SAME FOR 0-CHANNEL, BUT NO COMMUNICATION AFTER "APS" | |
| ⟨9⟩ | 00 | 3FE | BRLC OC3c INTRA-OFFICE COMMUNICATION FOR WORKING | 3F | 3FE |
| ⟨10⟩ | 00 | 3F9 | BRLC OC3c INTRA-OFFICE COMMUNICATION FOR PROTECTION | 3F | 3F9 |

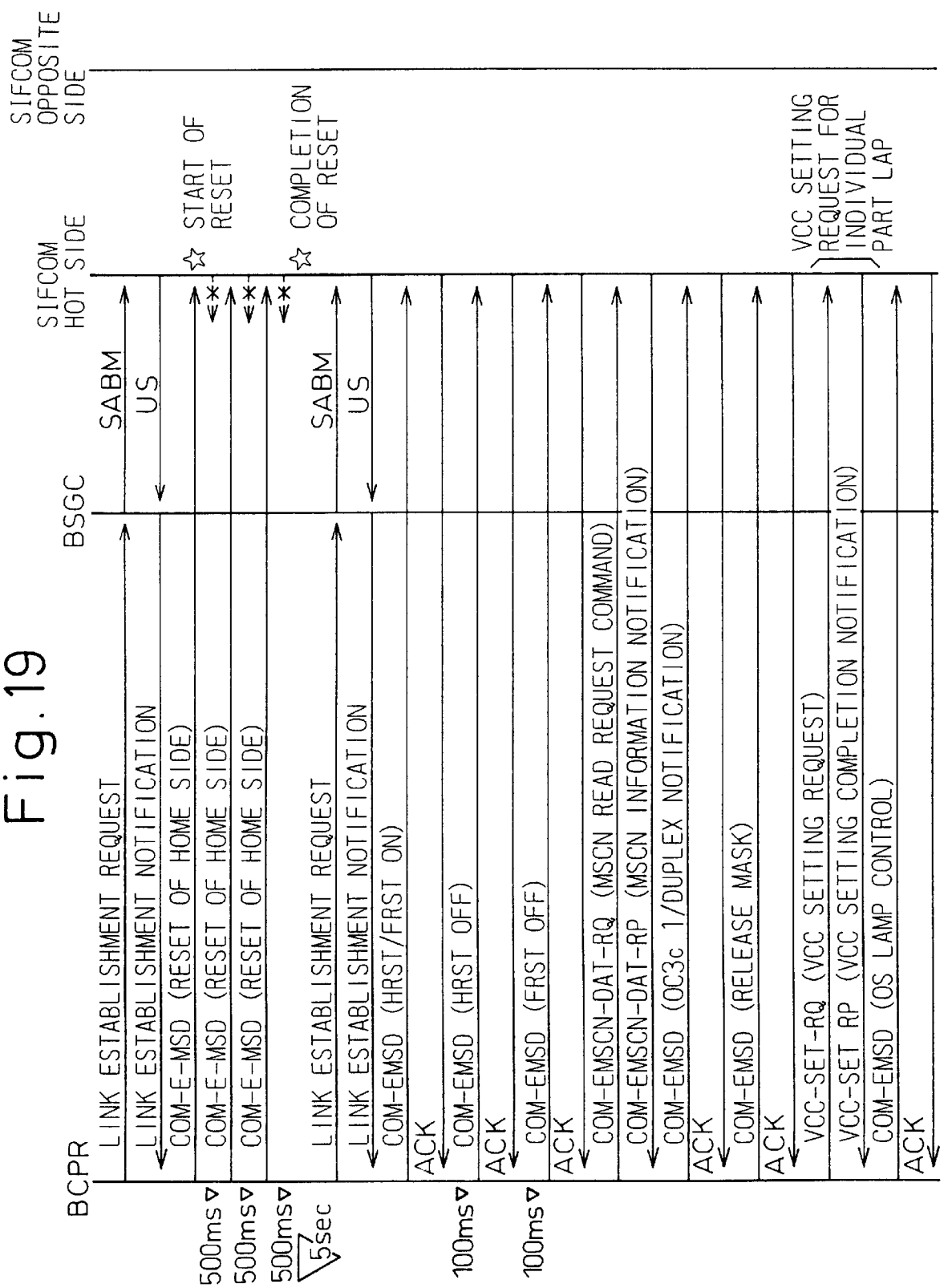

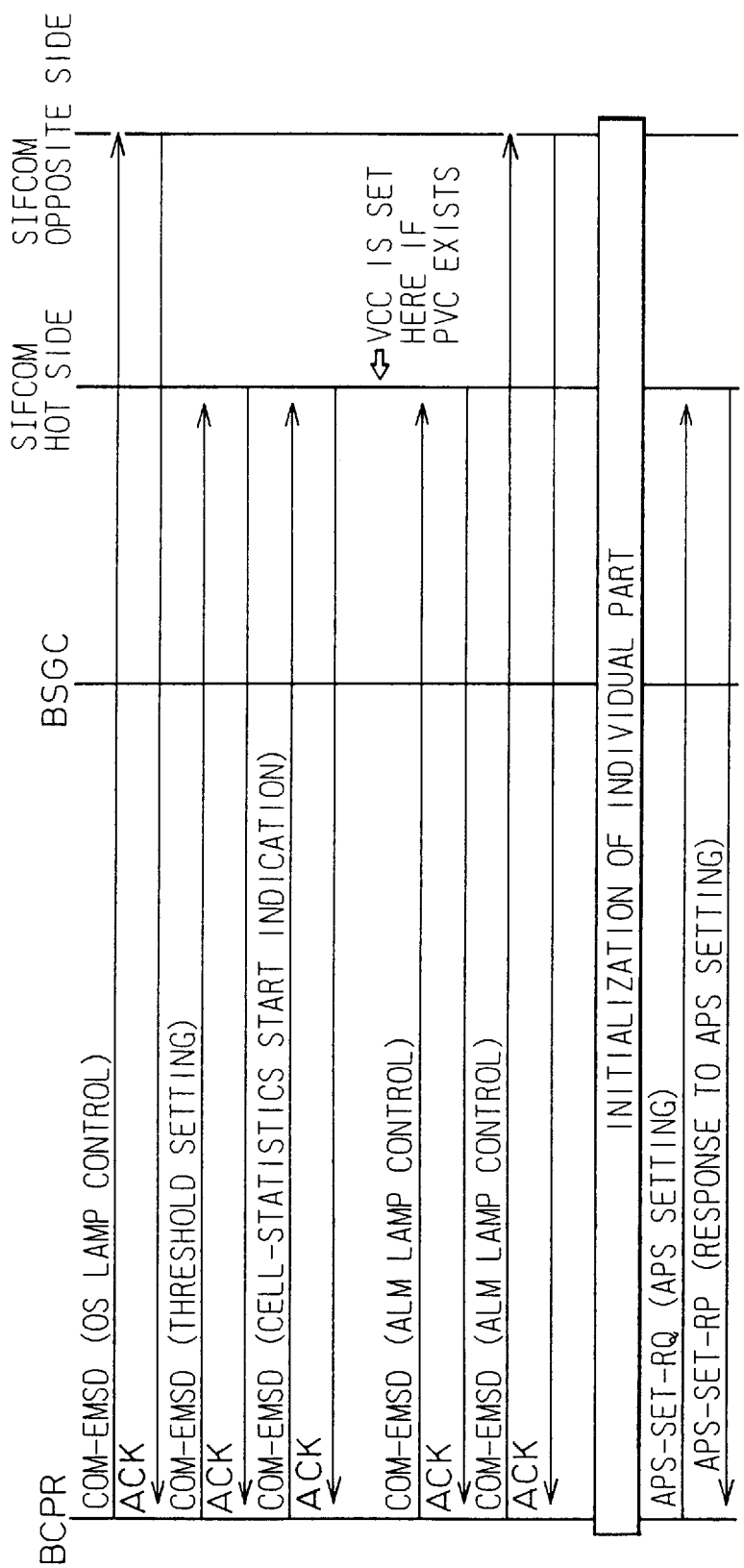

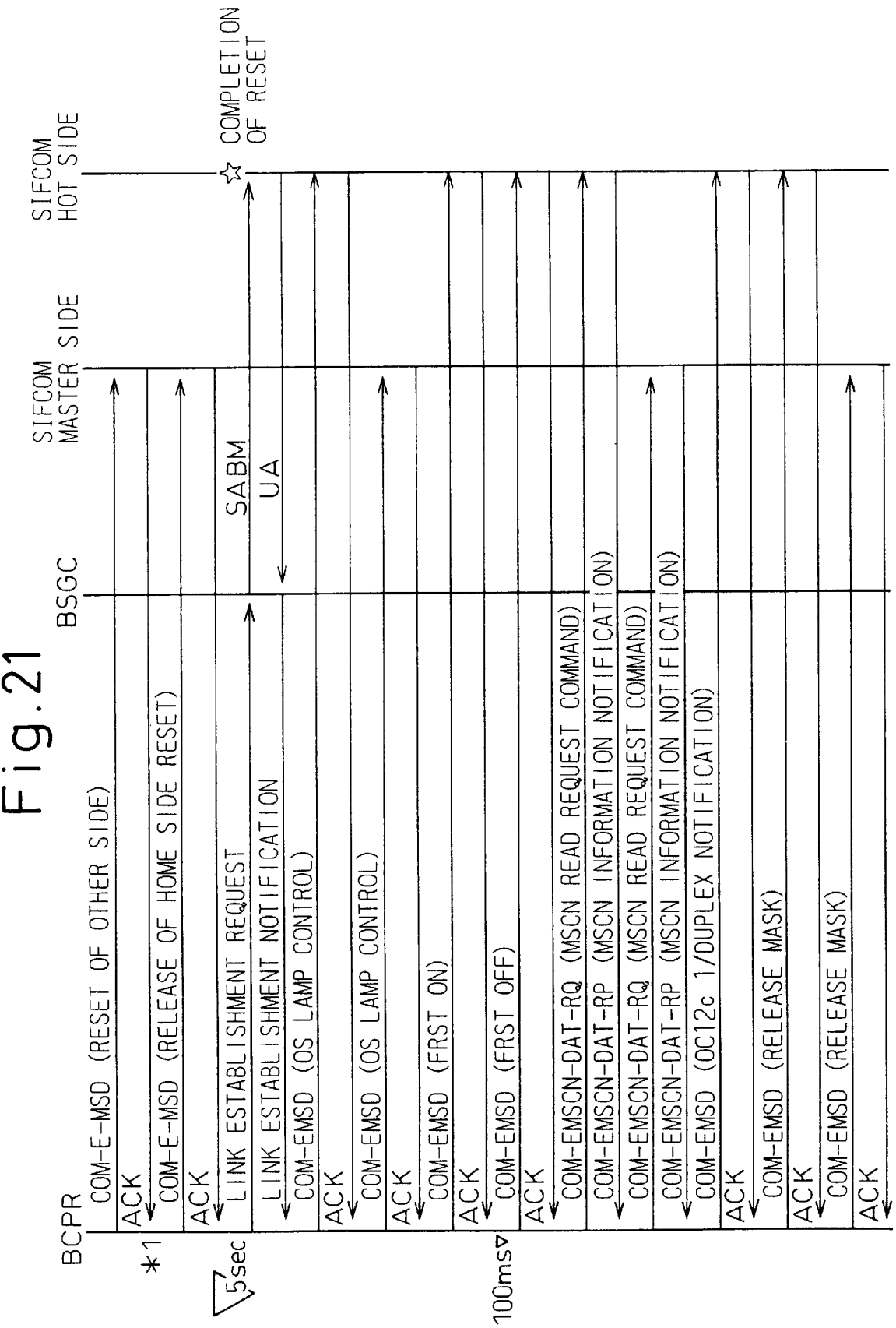

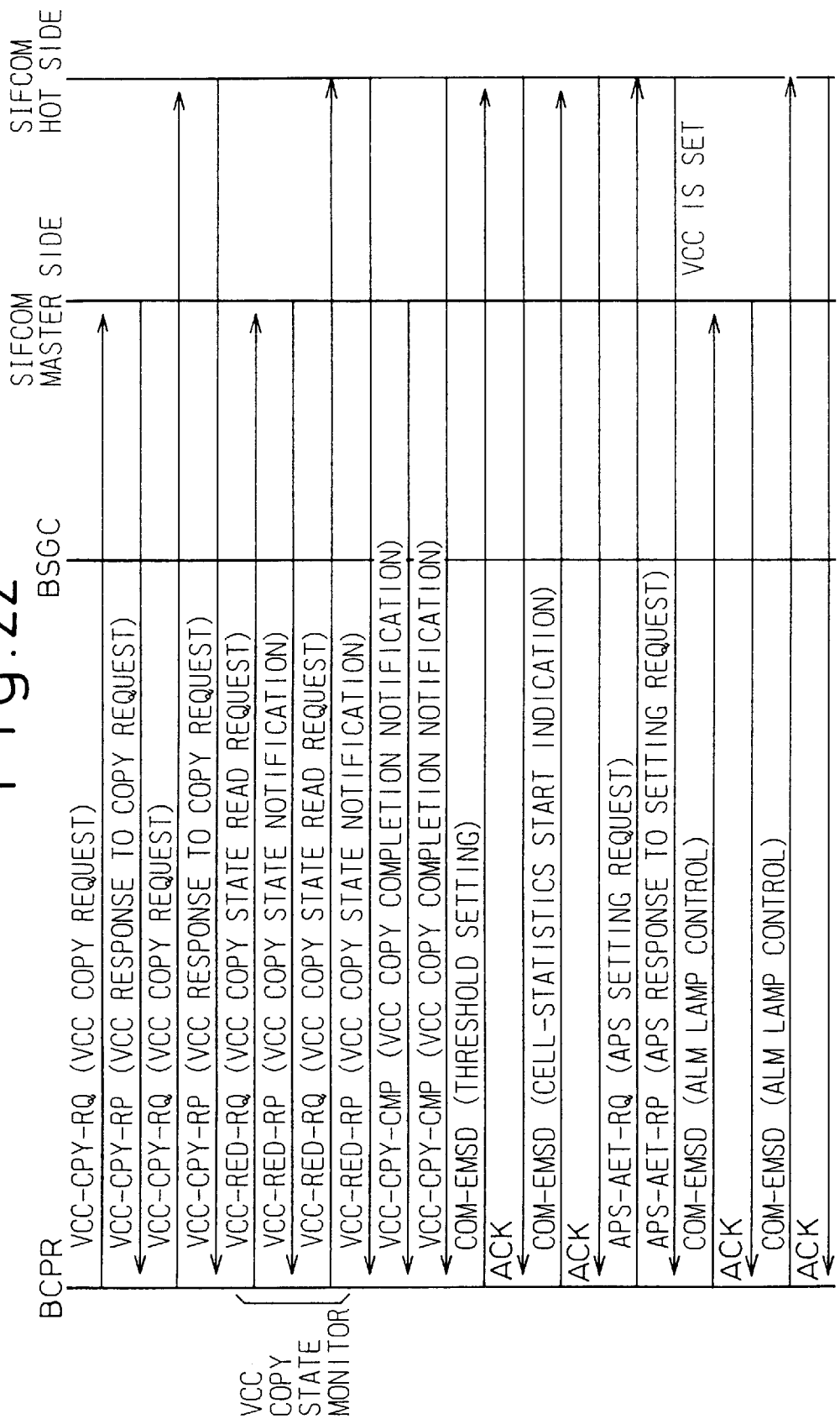

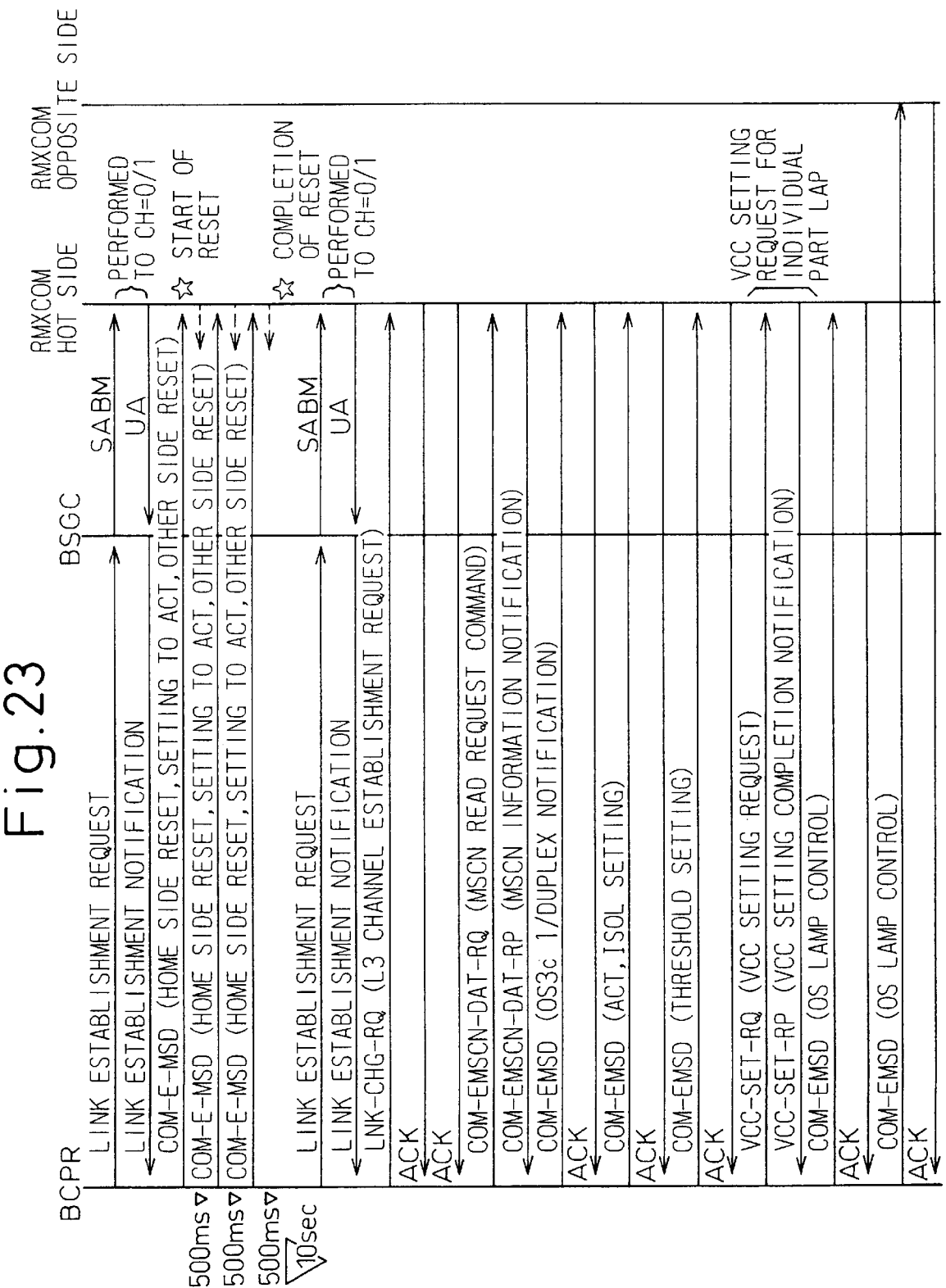

MSD (TRANSMITTING K1,K2)

| BIT ROW | B7 | B6 | B5 | B4 | B3 | B2 | B1 | B0 | |
|---|---|---|---|---|---|---|---|---|---|
| 12 | INT | INFMD | APSET | | | | | | |
| 13 | | SDRT | | | | | | SDK 1CH | (K1) |
| 14 | | | | SDK 2CH | | SDMODE | | | |

MSCN (RECEIVED K1,K2)

| BIT ROW | B7 | B6 | B5 | B4 | B3 | B2 | B1 | B0 | |
|---|---|---|---|---|---|---|---|---|---|
| 12 | INT | INFMD | APSET | | | | | | ⎫ |
| 13 | | SDRT | | | | | | SDK 1CH | ⎬ MSD ECHO BACK |
| 14 | | | | SDK 2CH | | SDMODE | | | ⎭ |
| 26 | INT | | SF | SD | | | | | |
| 27 | | RVRT | | | | | | RVK 1CH | |
| 28 | | | | RVK 2CH | | RVMODE | | | (K2) |

Fig.30

| | SINGLE | | | | DUPLEX | | | |
|---|---|---|---|---|---|---|---|---|
| | WORKING | | PROTECTION | | WORKING | | PROTECTION | |
| | OS | MACT | OS | MACT | OS | MACT | OS | MACT |
| STATE WHERE ONLY OFFICE DATA IS INTRODUCED | ON | ON | ON | ON | ON | ON | ON | ON |
| STATE WHERE IN-SERVICE IS PROVIDED — WORKING-ACT | OFF | ON | OFF | ON | OFF | ON | OFF | OFF |
| STATE WHERE IN-SERVICE IS PROVIDED — WORKING-SBY | | | | | OFF | OFF | OFF | ON |
| OUS STATE — WORKING-ACT | ON | ON | ON | ON | ON | OFF | ON | OFF |
| OUS STATE — WORKING-SBY | | | | | OFF | ON | OFF | ON |

Fig.34

CONTROL CELL

| BIT ROW | D7 | D6 | D5 | D4 | D3 | D2 | D1 | D0 |
|---|---|---|---|---|---|---|---|---|
| 000 | PLT1 | PLT0 | | | | | | DTEN |
| 001 | | | | | | | | |
| 002 | | | | | | | | |
| 003 | | SDFRST | μPRST | | | | | |
| 004 | | | | | | | | |
| 005 | | | | | | | | |
| 006 | | | | | | | | |
| 007 | | | | | | | | |
| 008 | | LOOP1 | | LOOP3 | LOOP5 | | | |
| 009 | WDTEPF | UHCRPF | DHCFPF | 19MCPF | | | | |
| 010 | UHCFPF | UHDPPF | DWCFPF | DWDPPF | EGERPF | | | |
| 011 | | | | | | | | |
| 012 | INT | INFMD | APSET | | | | | |
| 013 | SDRT | | | | | | | SDK1CH |
| 014 | | | | SDK2CH | SDMODE | | | |
| 015 | | | | | | | | |

K1 { 013, 014 } K1

UNUSED

| ROW\BIT | D7 | D6 | D5 | D4 | D3 | D2 | D1 | D0 |
|---|---|---|---|---|---|---|---|---|
| 000 | PLT1 | PLT0 | | | | | | |
| 001 | PWCB GROUP ID ||||||||
| 002 | SYNCF0 | PLTF0 | SYNCF1 | PLTF1 | IFALM0 | IFALM1 | | |
| 003 | | SDFRST | μPRST | INFMD | ACTIND | | | |
| 008 | | LOOP1 | | LOOP3 | LOOP5 | | | |
| 009 | WDTEPF | UHCRPF | DHCFPF | 19MCPF | | | | |
| 010 | UHCFPF | UHDPPF | DWCFPF | DWDPPF | EGERPF | | | |
| 011 | | | | | | | | |
| 012 | INT | INFMD | APSET | | | | | |
| 013 | SDRT |||||| | SDK1CH |
| 014 | | | | SDK2CH | SDMODE ||||
| 015 | EC-OUS | EC-ACT | | EC-MACT | | EC-T1D | EC-TQH | EC-T5M |
| 016 | | | | | | | | |
| 017 | FERR | HERR | | | | WDTE | LE | INS |
| 018 | | | | TIMALM | TALM | STCAALM | | CUPCE |
| 019 | | | | | TALMFLG | STCAFLG | | CUPCFLG |
| 020 | SYSCK0 | UHCRE0 | DHCFE0 | DHDPE0 | | | | |
| 021 | SYSCK1 | UHCRE1 | DHCFE1 | DHDPE1 | | | | |
| 022 | 19MCKE | UHCFE | UHDPE | | | | | |
| 023 | DWCFE | DWDPE | EGERR | | | | | |
| 024 | APSCBLE | | | | | | | |
| 025 | | | | | | | | |
| 026 | INT | | SF | SD | | | | |
| 027 | RVRT |||||| | RVK1CH |
| 028 | | | | RVK2CH | RVMODE ||||
| 029 | | | | | | | | |
| 255 | UNUSED ||||||||

K1 brackets rows 013–014. K2 brackets rows 027–029.

AUTOMATIC PROTECTION SWITCHING SYSTEM FOR ATM EXCHANGE NETWORK

BACKGROUND OF THE INVENTION

1. Field of the Invention

The present invention relates to an automatic protection switching (APS) system for an asynchronous transfer mode (ATM) exchange network.

2. Description of the Related Art

Recent advances in exchange network technology have led to use of ATM exchange networks in addition to integrated service digital networks (ISDNs). In an ATM exchange network, all communication information from tens of bits per second to hundreds of megabits per second are divided into fixed length packets or cells each composed of several tens to 128 octets, are transferred onto a transmission line of at least a 150 Mbps speed in a mixed fashion, and are subjected to high speed processing by high speed packet exchange.

From the viewpoint of the supervision and control of a digital network, in the past a large amount of overhead, such as for the transfer of line error detection information and line quality information, and the data communication, etc. was provided. Part of the overhead, for the purpose of preventing the suspension of service due to occurrence of a line failure, was provided with the APS function for automatically switching to a standby line upon the occurrence of a failure. Such an APS function, however, has never been provided in an ATM exchange network.

SUMMARY OF THE INVENTION

The present invention was made in consideration with this situation and has as an object thereof to provide an APS system for an ATM exchange network with which the reliability of the ATM exchange network with respect to a line failure can be improved.

To attain the above object, the present invention provides an APS system for an ATM exchange network in which a first equipment and a second equipment are connected by a duplex communication line comprising a working line and a protection line. Each of the first equipment and second equipment is provided with a bridging unit for bridging the working line and the protection line at their transmission sides; a switch for selecting the working line or the protection line at their reception sides, a K-byte generating function for generating byte information containing information for realizing the APS; a function for receiving the K-byte information from the protection line, analyzing the received information, placing the prescribed information in the K-byte, and thereby realizing the APS; and a function for changing over the switch. By this, the reliability of the APS system for the ATM exchange network with respect to a line failure in the ATM exchange network can be improved.

BRIEF DESCRIPTION OF THE DRAWINGS

These and other objects and features of the present invention will be more apparent from the following description of the preferred embodiments given with reference to the accompanying drawings, wherein:

FIG. 3 is an explanatory view of a K2 byte;

FIG. 4 is a view of detailed examples of codes to be placed in the K1 byte;

FIG. 5 is a view of details of an APS control command;

FIG. 6 is a view of a process of generation of a channel mismatch failure (CMF);

FIG. 8 is a view of an example of the conditions of detection times for startup detected at the OC3c;

FIGS. 9A, 9B, and 9C are explanatory views of an APS operation;

FIG. 12 is a view of details of a package constituting a subscriber interface common part (SIFCOM);

FIG. 15 is a view of an example of the overall configuration of a shelf;

FIG. 18 is a view of an example of the configuration of a virtual path identifier (VPI)/virtual channel identifier (VCI) table held in a virtual channel controller (VCC);

FIG. 19 is part 1 of a view of an example of the sequence for initializing the SIFCOM;

FIG. 20 is part 2 of a view of an example of the sequence for initializing the SIFCOM;

FIG. 21 is part 3 of a view of an example of the sequence for initializing the SIFCOM;

FIG. 22 is part 4 of a view of an example of the sequence for initializing the SIFCOM;

FIG. 23 is part 1 of a view of an example of the sequence for initializing a remote multiplexer common part (RMXCOM);

FIG. 30 is a view of an on/off state of the lamp.

FIG. 34 is part 1 of a view of an example of a format of a control cell for controlling the individual part;

FIG. 35 is part 2 of a view of an example of a format of a control cell for controlling the individual part;

DESCRIPTION OF THE PREFERRED EMBODIMENTS

Preferred embodiments of the present invention will be described next with reference to the related figures.

Figure 1:
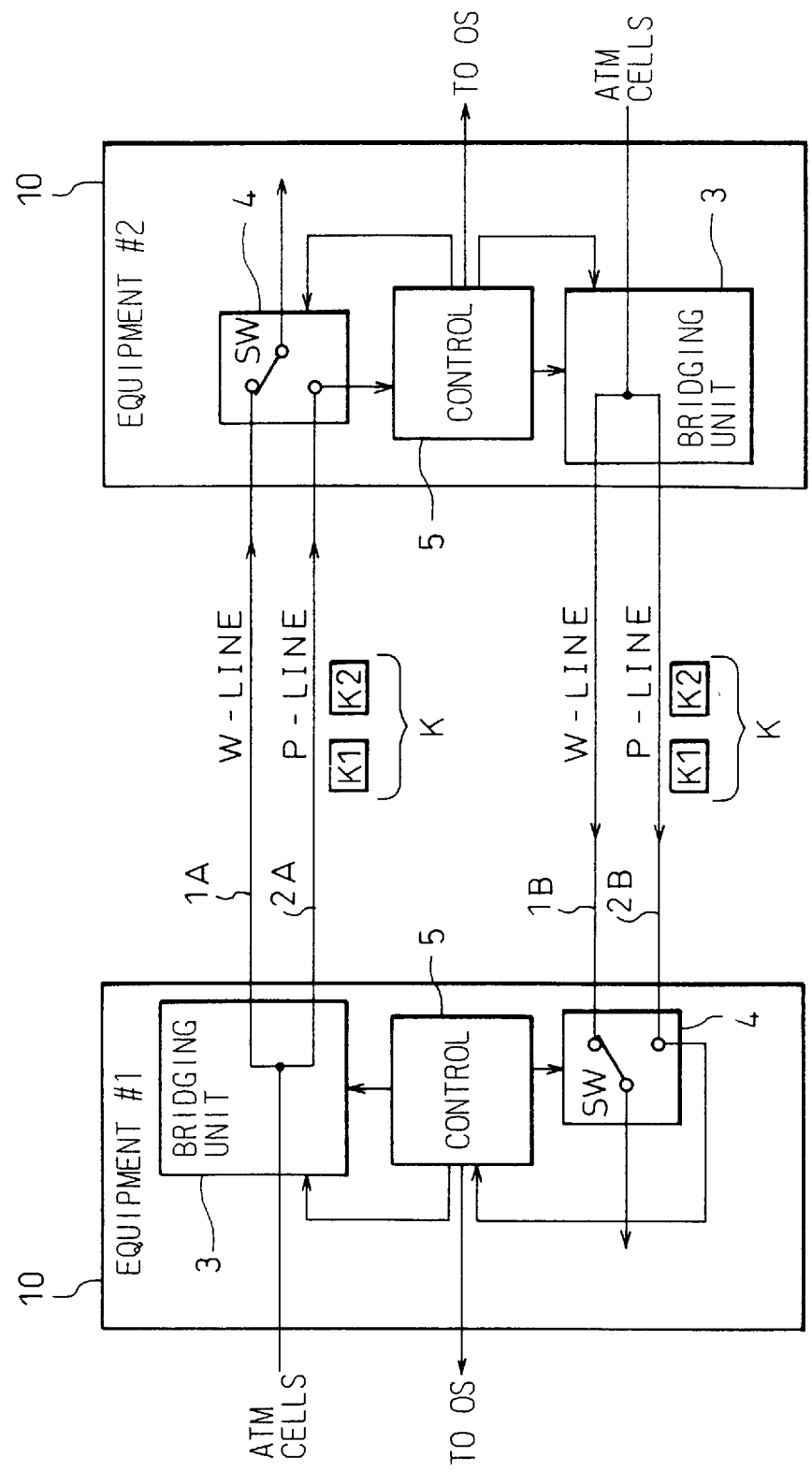
FIG. 1 is a block diagram showing the principle of the present invention.

FIG. 1 is a block diagram of the principle of the present invention. In the figure, reference numeral 10 is an equipment and shows an example where two equipments #1 and #2 are provided. Each of these first and second equipments 10 are provided with functions of an ATM exchange network. For example, a host office and remote office correspond to this. Reference numeral 1A is a working line (hereinafter abbreviated as a W-line) which is a communication line for connecting the first equipment 10 and the second equipment 10; and 2A is a protection line (hereinafter abbreviated as a P-line) which is similarly a communication line for connecting the first equipment 10 and the second equipment 10. Reference numeral 1B is a W-line, that is, the communication line for connecting the first equipment 10 and the second equipment 10, and 2B is a P-line which is similarly a communication line for connecting the first equipment 10 and the second equipment 10. In this way, in the system shown in the figure, two W-lines 1A and 1B and two P-lines 2A and 2B are respectively introduced to form bidirectional duplex communication lines.

Reference numeral 3 shows a bridging unit which bridges the W-line and the P-line at their transmission sides. Reference numeral 4 shows a switch for selecting the W-line or the P-line at their reception sides. The bridging unit 3 fixedly connects the W-line 1A and P-line 2A, or the W-line 1B and the P-line 2B, at the output sides of the signal as shown in the figure and is also referred to as a permanent bridge. The division and output of the signal to both of the W-line and the P-line at the bridging unit 3 in this way is referred to as a "multidrop". Reference numeral 5 is a control means having a K-byte generating function for generating byte information containing information for realizing the APS; a function for receiving the K-byte information from the P-line, analyzing the received information, placing the designated information in the K-byte, and thereby realizing the APS; and a function for changing over the switch 4. As other functions of the control means 5, the control means 5 has a function of detecting various types of alarms and notifying them to an operating system (OS), i.e., an operator, and a function of disconnecting the bridge of the bridging unit 3. As the control means 5, for example a central processing unit (CPU) is used.

The control means 5 also performs control for discriminating signaling cells and user cells when transferring externally input ATM cells (for example, user cells) and signaling cells generated for performing the APS between the first equipment 10 and the second equipment 10.

Due to such a configuration, an APS system for an ATM exchange network with which the reliability against the line failure caused in the ATM exchange network can be improved can be provided.

In this case, the K-byte is composed of a K1 byte and a K2 byte. The K1 byte can include request-type information and channel information, and the K2 byte can include the channel information and operation mode information.

By combining the K1 byte and the K2 byte having such a configuration, the APS can be reliably performed.

Further, as line termination units (individual parts) for terminating the lines respectively provided in the first and second equipments 10, OC3c, OC12c, or DS3 can be used. The OC3c are optical signals of 150 Mbps, the OC12c are optical signals of 600 Mbps, and the DS3 are electric signals of 50 Mbps. When optical signals are used, it is necessary to provide an opto/electronic (O/E) converting function in the individual part. OC means an "optical carrier".

Due to such a configuration, information can be transferred at a high speed.

Further, where there are a plurality of individual parts as described before, the combinations of the working line and the protection line can be fixedly assigned by pairing up two individual parts.

Due to such a configuration, the design of the system can be facilitated.

Further, where there are a plurality of individual parts as described above, it is also possible to freely set the combinations of the working line and the protection line by pairing up two individual parts.

Due to such a configuration, the combination of the individual parts can be made variable in accordance with the requested condition of the office.

Further, it is possible to externally set a software controlled command in a request-type information portion in the K1 byte.

Due to such a configuration, the firmware can autonomously perform the APS.

Further, where performing switching control between the active sides and the standby sides of the working lines and the protection lines, the K1 byte and the K2 byte are compared and a certain bridge switch request is issued to an opposing side. In response to this, the K2 byte indicating the bridge completion returns, and when the channel number (channel information) in that transmitted K1 byte and the channel number in the received K2 byte match, the APS can be autonomously performed by hardware performing the switching.

By adopting such a sequence, reliable APS in the ATM exchange network can be executed.

Further, in a case where the first and second equipments 10 are respectively constituted by a plurality of individual parts and a common part connected to these individual parts, when notification is received of a failure at cross connections between the individual parts supervised by the common part, the control means 5 rewrites the contents of the K1 byte and the K2 byte and can switch the line between the active side and the standby side.

By adopting such a configuration, the active side and the standby side can be reliably switched.

Further, when the APS failure is restored, the control means 5 detecting the restoration of the failure can rewrite the channel information in the K1 byte and the K2 byte and autonomously switch back from the protection line to the working line by hardware.

By adopting such a configuration, the switch back after the restoration of failure can be reliably performed. Here, the "switch back" means the change over of lines from the P-line to the W-line.

Further, when the APS failure is restored, a software controlled command is externally given to the control means 5, the request-type information in the K1 byte is rewritten, and thereby it is also possible to perform autonomous switch back from the P-line to the W-line by software.

By adopting such a configuration, the switch back after the restoration of the failure can be reliably performed.

Further, it is possible for the control means 5 not to send a notification of bridge completion for a channel number since a bridge has not been formed with respect to the individual part out of service in the case of a 1+1 bidirectional mode.

Here, a "1+1 bidirectional mode" means a mode in which the W-line is always bridged to the P-line as well in the Bellcore recommendations.

By adopting such a configuration, the individual part out of service is disconnected from the system, and the reliability of the operation of the system can be enhanced.

Further, in the connection between a remote office and host office in a case where the first equipment 10 is the remote office and the second equipment 10 is the host office, the characteristic feature resides in that the up highway signaling cell (in-office cell) discrimination bits from the individual part in the remote office are made ON. Those bits are made OFF by a virtual channel controller (VCC) provided in the host office.

Here, the "user cell" means the ATM cell conveying the usual information, and the "signaling cell" means the cell for the equipment control (for example APS use).

By adopting such a configuration, the control means 5 in the host office can differentiate the user cells and the signaling cells communicated between the host office and the remote office.

Further, at the initialization of the host office and the remote office, first, the APS is started up on the remote side, next the host side is started up, then the VPI/VCI value of each individual part in the host office and the remote office is set to a different value for every individual part. Here, the virtual channel controller is provided with a table storing the VPI/VCI value for every individual part.

By adopting such a sequence, the host office and the remote office can be reliably initialized.

Further, when setting up APS for a common part in the host office, a command for setting a duplex is given from the operating system (OS) to the common part, the tag C (TAG C) of the demultiplexer is restored to a fixed value (default value) for the unit, and the thereby the I/O is duplexed. Further, it is possible to determine the ACT side of the individual parts, set up the duplex system for the individual parts, and designate the W-line and P-line.

By adopting such a sequence, the APS can be reliably set up for the common part in the host office.

Further, when setting up APS for the common part in a remote office, the command for setting the duplex is given from the operating system to the common part and the duplex system for the individual parts is set up. Further, the tag C of the demultiplexer can be multidropped.

By adopting such a sequence, the APS can be reliably set for the common part in the remote office.

Further, in order to restore the APS state at the time of restoration from a duplexing failure at the common part, the content of the message of the APS set request (APS-SET-RQ) can be determined as follows in accordance with the timing of transmission of that request:

<1> The APS information in the message is established for the reception side of the message.

<2> The reception side of the message sets the APS information of the other side (#1) at the home side (#0).

<3> The message is set for both sides.

By adopting such a sequence, even if a duplexing failure occurs at the common part, the APS can be reliably established.

Further, when the standby side is put out of service, the working line is switched to the protection line by the forced switch (Forced SW) command. Further, "lockout of protection" can be set for the protection line.

Here, the Forced SW (forced switch) is a software controlled command from the outside to be placed in the request type region in the K1 byte and is a command for forcibly performing the switching. Further, the "lockout of protection" is an externally controlled command for inhibiting the switching to the P-line.

By adopting such a sequence, the standby side can be reliably placed out-of-service.

Further, when the both sides (ACT, SBY) are to be put out-of-service, the following procedures can be performed:

<1> A "lockout of protection" is established.

<2> The protection line is placed out-of-service.

<3> The working line is placed out-of-service.

By adopting such a sequence, the both sides can be reliably placed out-of-service.

Further, when the out-of-service states of the both sides are to be released, the following procedures can be performed:

<1> The out-of-service state of the working line is released.

<2> The out-of-service state of the protection line is released.

By adopting such a sequence, the out-of-service states of the both sides can be reliably released.

Further, where the both sides of the common part fail in a state where the individual parts are placed out-of-service, the control means 5 holds the out-of-service state by the software. Then, when the failure of the common part is restored, the out-of-service state of the individual parts can be notified by the APS start notification (command from an operator).

By adopting such a configuration, the failure can be reliably restored.

Further, a plurality of lamps indicating the status are provided in the individual parts. The control means 5 can control the indications of the lamps according to a table defining their statuses.

By adopting such a configuration, the status of the individual parts at the time of APS control can be easily recognized.

Below, an embodiment of the present invention will be explained in detail by referring to the drawings.

The APS method includes the following methods:

<1> 1+1 method

<2> 1:n method

<3> 1:1 method

The 1+1 method is a method for transmitting the signal in a state where a bridge is fixedly formed at the outgoing side of the signal. The 1+1 method includes a unidirectional mode and a bidirectional mode. For both modes, it is possible to select a non-revertive (switching is inhibited even at the restoration of the failure) or a revertive (switching is allowed) mode.

The 1:n method is a method performing APS between one P-line and n number of W-lines. There are a unidirectional mode and a bidirectional mode. In this case, both of them are revertive (switching is allowed).

The 1:1 method is a method for performing APS between one W-line and one P-line corresponding to the time when n=1 in the 1:n method of <2>. There are a unidirectional mode and a bidirectional mode. In this case, both of them are revertive (switching is allowed).

The present invention uses the bidirectional of the 1+1 method of <1> and non-revertive mode.

The protocol of the APS is performed using the two bytes of the K1 byte and the K2 byte.

Figure 2:
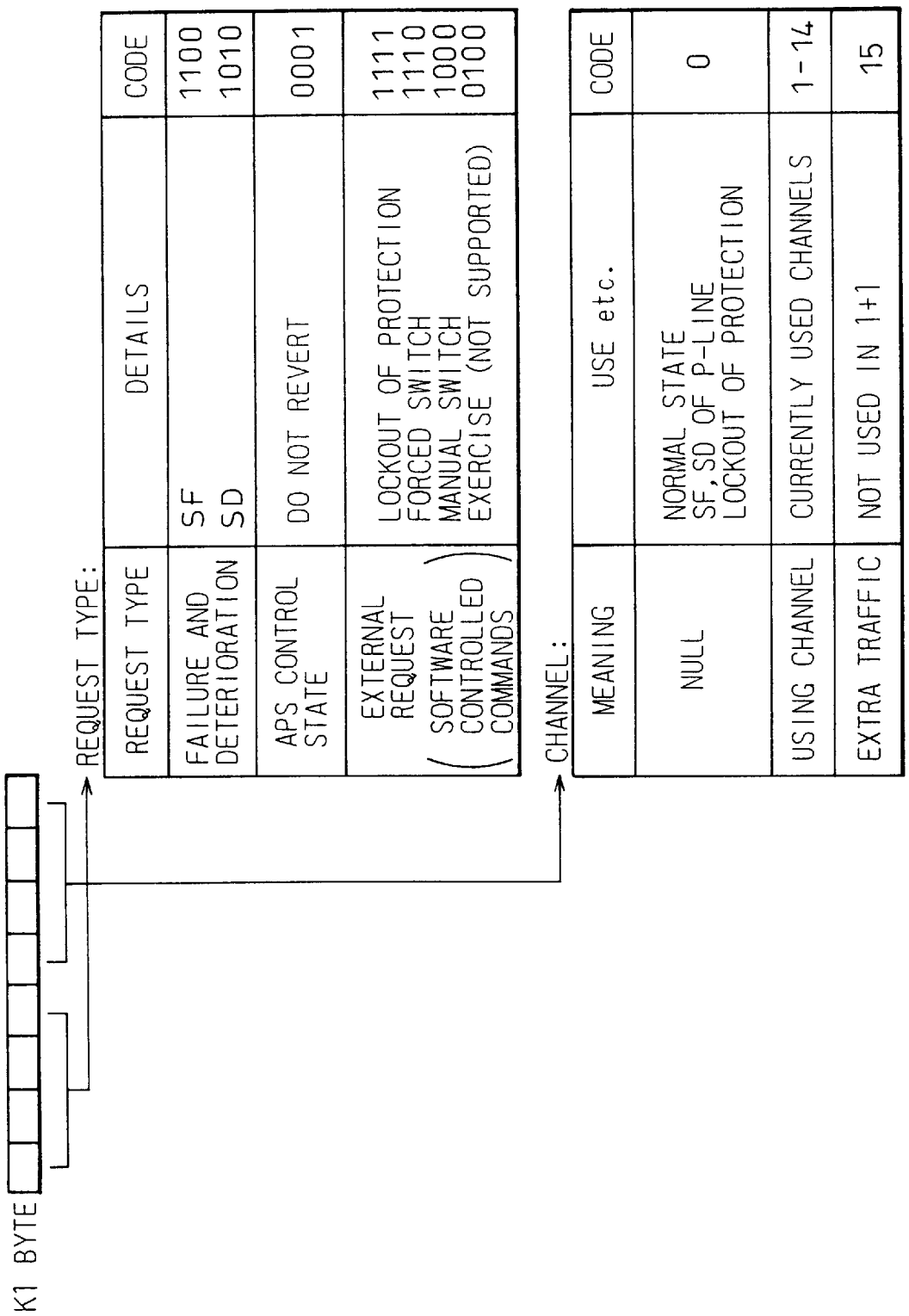
FIG. 2 is an explanatory view of a K1 byte.

FIG. 2 is an explanatory view of the K1 byte. The K1 byte is the byte having significance at the time of transmission. As shown in the figure, it is composed of a request type region of 4 bits of the first half and a channel information region of 4 bits of the latter half. In the request type, external requests, that is, the failure information, an APS control state, and a software controlled command, are set. The classifications of these requests are indicated as classifications of codes. That is, the type of the failure and the type of the external requests are all expressed only by codes. For example, a code "1100" is a hardware failure referred to as an SF (signal failure). A code "0001" is a control state such as "Do Not Revert" (inhibit the switching (OK even if the switching is not performed)). A code "1111" is an external request such as "lockout of protection" (inhibit the switching to the P-line side). The operator inputs the software controlled command from a keyboard, and these external requests are notified to the control means 5 via the operating system (OS). The control means 5 controls the change over of the switch 4. By this, the firmware can autonomously perform the APS.

Contrary to this, in the channel shown in the bottom section of FIG. 2, "null" is indicated by code "0 (decimal)", which indicates the normal state and the failure of the hardware of the P-line (accordingly "lockout of protection"). The "using channel" indicates the channel which is now being used. As the codes, decimal values of from 1 to 14 are used. Note that, in the present invention, the W-line is defined as a channel 0 (CH0) and the P-line is defined as a channel 1 (CH1).

The rules of generation of an K1 byte is as follows:

(1) Priority order decision

<1> All requests of SF, SD (signal degrade), "do not revert", forced switch, manual switch, etc. on the home office side are decided by the logic of the priority order.

<2> When requests having the same degree of priority are simultaneously generated from a plurality of lines, priority is given to the line having a smaller CHNo.

<3> Replacement of requests on the home office side occurs only by a request having a high priority order (for example, if the requests have the same degree of priority, the replacement is not performed).

<4> Only a correct request to a correct line is regarded to be judged.

<5> In the bidirectional mode, which of the request on the home office side and the request from the other office side should be regarded as the object is decided by the logic of the priority order.

(2) Receive request transmission

A receive request (switch request of channel) is transmitted in the following cases.

<1> When the priority of the request on the opposing office side is the highest in the priority order decision.

<2> When the requests have the same priority and a receive request has been already transmitted (that is when a request having the same degree of priority as that on the opposing office side is generated at the home office side).

<3> When requests have the same priority and the receive request has not yet been transmitted from the home office side, and the CH No. relating to the request from the opposing office side is the smallest.

In cases other than the above, the K1 byte indicates the request on the home office side.

Further, in the non-revertive mode, where there is no request at the home office side, it is assumed to be a "do not revert" request and a "do not revert" request is transmitted.

Next, an explanation will be made of the K2 byte.

FIG. 3 is an explanatory view of the K2 byte. The K2 byte is a byte which is significant at the time of reception. The 4 bits of the first half are the channel information region, the first bit of the latter half is an architecture information region, and the 3 bits of the latter half are the operation mode information region. The architecture region is fixed to "0" (decimal) in the 1+1 mode. Further, the operation mode of the 3 bits of the latter half is fixed to "101" in the bidirectional mode.

For the channel region of the 4 bits of first half, CH0 is inserted when the CH No. of the received K1 byte is null (0). The CH No. (CH1 in the present invention) bridged to the P-line is placed in a case other than this.

The above K1 byte and K2 byte are transmitted over the P-line. A similar K1 byte and K2 byte are sent also onto the W-line (since a permanent bridge configuration is adopted). In the case of APS control, however, the control means 5 on the reception side ignores the APS channel information on the W-line. Then, the latest K1 and K2 codes (current codes) are replaced with the previous K1 and K2 codes at first when three frames are continuously received by the equipment. This is for ensuring the reliability of the APS operation.

FIG. 4 is a view of the detailed codes to be placed in the K1 byte. In the figure, the codes of the respective functions are defined in the order from the highest degree of priority down. For example, the "lockout of protection" of "1111" becomes the code having the highest degree of priority.

An invalid code is defined as a code not used in the code table shown in FIG. 4 or a code inadequate for control (for example a switch request to a nonexisting channel). An incorrect code and unused code as a mode must not be transmitted. Even if the invalid code is received as a current code, the switching operation is not directly induced. In the 1+1 and bidirectional mode, "do not revert" is treated as the correct code.

By combining the K1 byte and K2 byte having such a configuration, the APS can be reliably performed.

FIG. 5 is a view of details of commands used for the APS control and shows the switch commands. A switch command is notified to the control means 5 via the operating system (OS) by input from the keyboard by the operator. When receiving this switch command, the control means 5 sets this information in the request type region in the K1 byte. In this figure, the type of the command and the operation corresponding to this are shown. When a request having a high degree of priority (SF, SD, forced switch, etc.) is to be executed during a manual switch state, the manual switch state disappears. Namely, even if SF and SD are restored or the forced switch command is cleared, the status does not return to the manual switch state.

Among the commands of FIG. 5, a "clear" command is a command for clearing the switch command. In the case of the non-revertive mode, even if the present command is given, no switch back occurs, but the switching state is cleared. Namely, the request type in the K1 byte is changed from manual switch etc. to "do not revert".

Further, for the "lockout of protection" command, when the opposing office side is placed out of service during a lockout of the home office side, the setting of the lockout state in the home office side is released. This is because the same method as the Fujitsu "FLM" (transmission apparatus of SONET synchronous network—also referred to as a terminal office apparatus) is adopted. Further, even if the W-line side suffers from a line failure during a lockout, the message of a switching failure is not output. This is because the priority order is low.

As the APS control commands other than the switch commands shown in FIG. 5, there are a switching state indication command and other control commands.

Next, an explanation will be made of various types of alarms during the APS operation. The causes of these alarms are detected by the control means 5.

(1) PBF (protection switching byte failure)

<1> Where the received K1 byte is an inadequate code which is inherently impossible for a normal switch, the result is a PBF. As definitions of a PBF, an inconstant APS and invalid code can be mentioned. They are respectively defined by numbers of repeated frames when regarded as being detected.

<2> After a PBF is detected, a PBF state is entered within 50 ms. The PBF state is left within 50 ms after restoration of the PBF is detected.

<3> When the PBF state continues for 2.5±0.5 seconds, the control means 5 performs the following operation:

Sending of message to operating system (OS)

A channel which has been switched to the P-line is switched back to the W-line. The message of the switch back is notified to the operating system.

After the PBF is notified, the state is left from PBF. When 10±0.5 seconds elapse, the control means 5 clears the PBF and sends a clear message to the operating system (OS).

(2) CMF (channel mismatch failure)

<1> When a mismatch occurs between the CH No. of the transmitting K1 byte and the CH No. of the received K2 byte, the result is a CMF alarm.

FIG. 6 is a view of the state of generation of a CMF. First, the CHNo. of the transmitting K1 byte is continuously transmitted three times (S1). At the point of time when the first K1 byte is transmitted, the 100 ms timer starts the operation. Then, when the CHNo. of the received K2 byte matches with the CHNo. of the transmitting K1 byte, the channel is switched (switched from the W-line to the P-line) (S2). If the state of mismatch of the CHNo. of the received K2 byte with the CHNo. of the transmitting K1 byte continues for 100 ms at step S2, a counter (not shown) runs out of time and the CMF is generated (S3).

In this case, when the state of the CMF continues for 2.5±0.5 seconds, the control means 5 sends a message to the operating system (OS). Further, when there is a match of the CHNo. continuously for 3 frames from the CMF state, the switch 4 is operated (control of MXACT) and the CMF state is left. Further, when a state which is not the CMF continues for 10±0.5 seconds after the control means 5 sends the CMF message, a CMF clear message is sent to the operating system. Note that the MXACT is an active side multiplexer (MUX).

(3) AMM (APS mode mismatch) failure

An AMM is issued in the following cases of <1> and <2>:

<1> When the equipment which gives a 1+1 mode receives an indication of the architecture (in the K2 byte) from the equipment which gives a 1:n mode or when the equipment which gives a 1:n mode receives a similar indication from the equipment which gives a 1+1 mode.

<2> When the equipment which gives a bidirectional mode receives a similar indication (K2) from the equipment which gives a unidirectional mode or when the equipment which gives a unidirectional mode receives a similar indication (K2) from the equipment which gives a bidirectional mode.

In this case, when receiving five or more frames the same as the frame indicating the mode mismatch (reception of K1), the result becomes an AMM within 100 ms. Further, when the AMM state continues for 2.5±0.5 seconds, the control means 5 sends a message to the operating system. Further, when the modes match continuously for 5 frames or more, the AMM state is left within 50 ms. Further, after the AMM message is sent, when 10±0.5 seconds elapse after the AMM state is left, the control means 5 sends a CMF clear message to the operating system.

(4) FEPF (far end protection line failure)

When receiving an SF (signaling failure) in the P-line (from the received K1), the state is one where the control means 5 can soon no longer execute P-line switching. At this time, when the P-line has been switched to, the state is switched back to the W-line. Further, when the SF of the P-line is received continuously for 3 frames, the FEPF state is entered. When the FEPF state continues for 2.5±0.5 seconds, the control means 5 sends an FEPF message to the operating system. Further, when a correct K1 byte other than the SF in the P-line is received continuously 3 times, the FEPF state is left. Further, when 10±0.5 seconds elapse after leaving the FEPF state, the control means 5 issues an FEPF clear message.

Figure 7A:
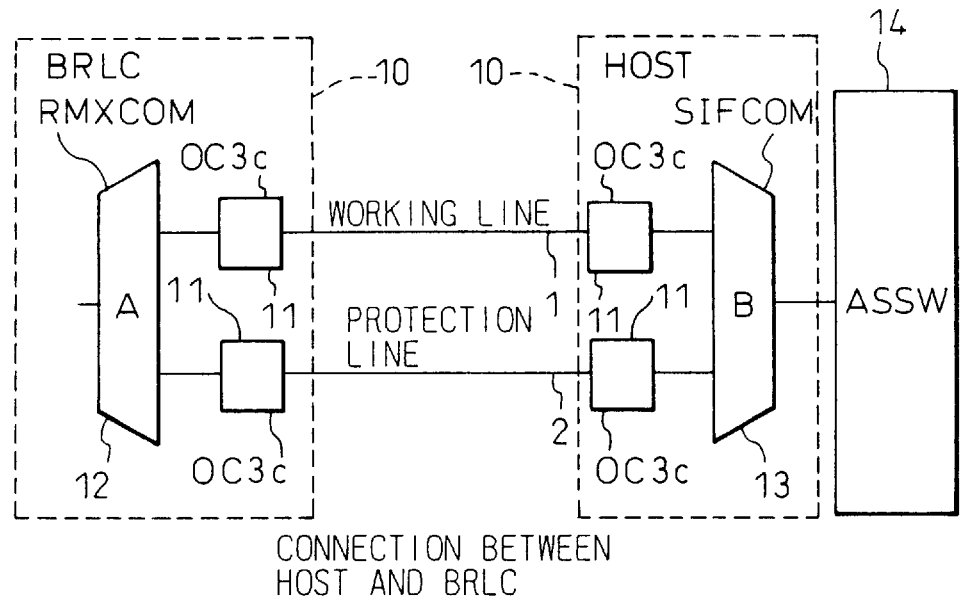
FIGS. 7A and 7B are block diagrams of a concrete example of the configuration of the system shown in FIG. 1.
Figure 7B:
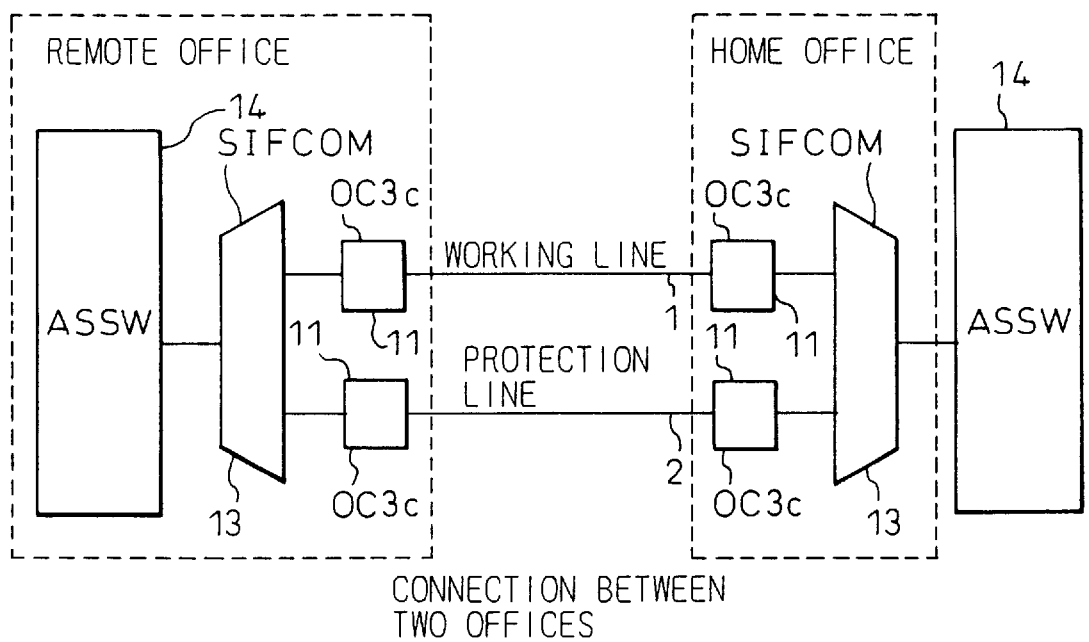

FIGS. 7A and 7B are block diagrams of an example of the concrete configuration of the system shown in FIG. 1. FIG. 7A shows an example in which the first equipment is defined as the remote office and the second equipment is defined as the host office. FIG. 7B shows a case where both of the first equipment and the second equipment are defined as the host offices. BRLC in the figure indicates a broad-band remote line concentrator. In the broad-band remote line concentrator BRLC, 12 is a common part in the remote office (RMXCOM: remote multiplexer common part), and 11 is an OC3c serving as an individual part (line termination unit of 150 Mbps—also referred to as a line corresponding part). Reference numeral 1 shows the W-line, and 2 shows the P-line. In the figure, both of the W-line and the P-line are indicated by one line, but both of them are constituted by two communication lines each for realizing a bidirectional mode (refer to 1A, 1B, 2A, and 2B of FIG. 1).

On the other hand, in the host office, 11 is the OC3c serving as an individual part similar to the remote office, 13 is a common part (SIFCOM: Subscriber Interface Common Part) in the host office, and 14 is for example an ATM switch unit (ASSW). The ATM switching function is contained in the host office, while the remote office contains only a line concentration function. In FIG. 7B, the same elements as those of FIG. 7A are indicated by the same references. FIG. 7B shows the case where the host offices are connected to each other. However, in both of the remote office and the host office, the individual parts 11 and the common part 12 or 13 connected to these individual parts 11 have the same configuration. Therefore the present invention can be applied to both of the case where the remote office and the host office are connected as shown in FIG. 7A and the case where host offices are connected to each other as shown in FIG. 7B. Explaining the correspondence between the connection configurations shown in FIGS. 7A and 7B and the view of the principle of the invention shown in FIG. 1, the switch 4 and the bridge unit 3 of FIG. 1 are constituted by combining part of the functions of the individual part 11 and the common part 13 in FIG. 7. Note that, in the control means 5 shown in FIG. 1, the CPU parts (not illustrated) performing the overall control of the equipments are extracted and shown in FIGS. 7A and 7B.

According to the present invention, the configurations of the individual parts and the common part contained in the host offices and the remote offices for the APS between host offices or between a remote office and a host office are the same, therefore the APS control can be performed in the same way.

Next, an explanation will be made of the conditions for startup of APS. In order to autonomously perform the APS function by firmware, there must be external notification by a software controlled command. Specifically, the operator inputs a command from a keyboard and sends this to the control means 5 via the operating system. After this command is sent, the APS first becomes operable. Next, an explanation will be made of a case where the APS is performed autonomously by hardware. Where the APS is activated autonomously by hardware, it is started up by for example the OC3c, which is the line corresponding part (individual part), first detecting the failure as follows and notifying this to the control means 5:

<1> SF (signal failure)

In this case, the APS is activated at the time of a loss of signal (LOS—state where no more signals arrive), at the time of a loss of frame (LOF—frame failure), at the time of a line alarm indicating signal (AIS—alarm indicating a defect of the signal coming from the opposing side), and when the bit error rate (BER) is $10^{-3}$ or more, FIG. 8 is a view of an example of the conditions of detection times for startup detected at the OC3c. The maximum value and a target value are indicated for every bit error rate (BER). Note that the time required for detecting the activation is for example 100 ms or less.

<2> SD (signal degrade)

A SD is activated when the bit error rate is larger than $10^{-5}$. Note that the value of the bit error rate can be freely set by the user.

Next, even when a failure occurs at cross connections between one common part and the other common part, the APS can be activated by notifying the failure to the control means 5 by the common part as well. Further, in the system of the present invention, a command for controlling the common part other than the APS command is provided as a command for controlling the common part. Therefore, it is also possible to activate the APS by forcibly causing a failure in an individual part by using this command and detecting that failure on the opposing side. Note that a failure at the cross connections at COM-E-MSCN is also regarded as an object for activation of the APS. Even in a case of for example the blowing of a fuse of either of the individual parts #0 to #7, power supply failure, pull out of package, etc., the failure can be notified to the control means 5 and the APS can be activated. Note that COM-E-MSCN means a common part-extended-maintenance scan.

Next, an explanation will be made of the operation of the APS.

Figure 9A:
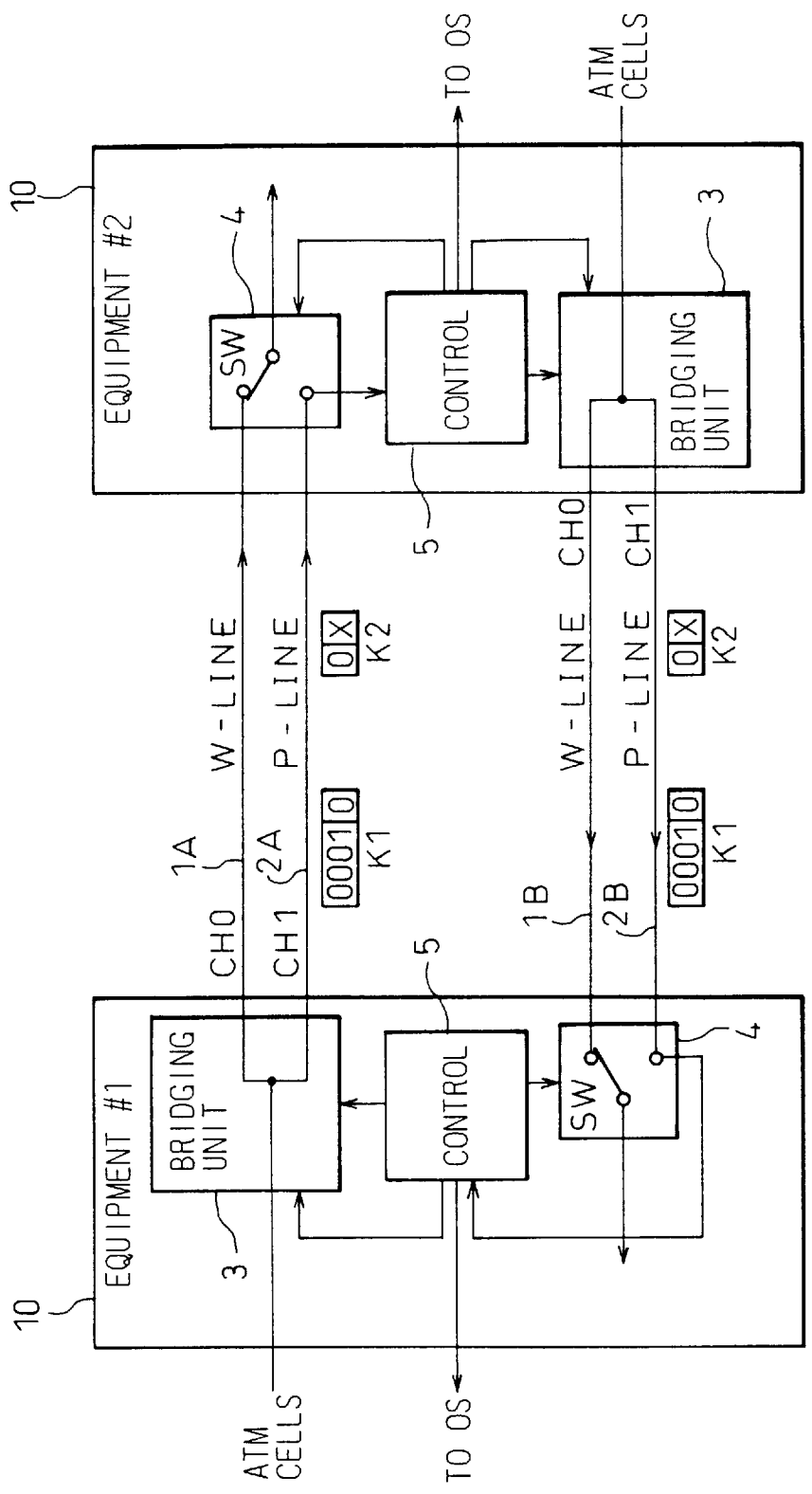
Figure 9B:
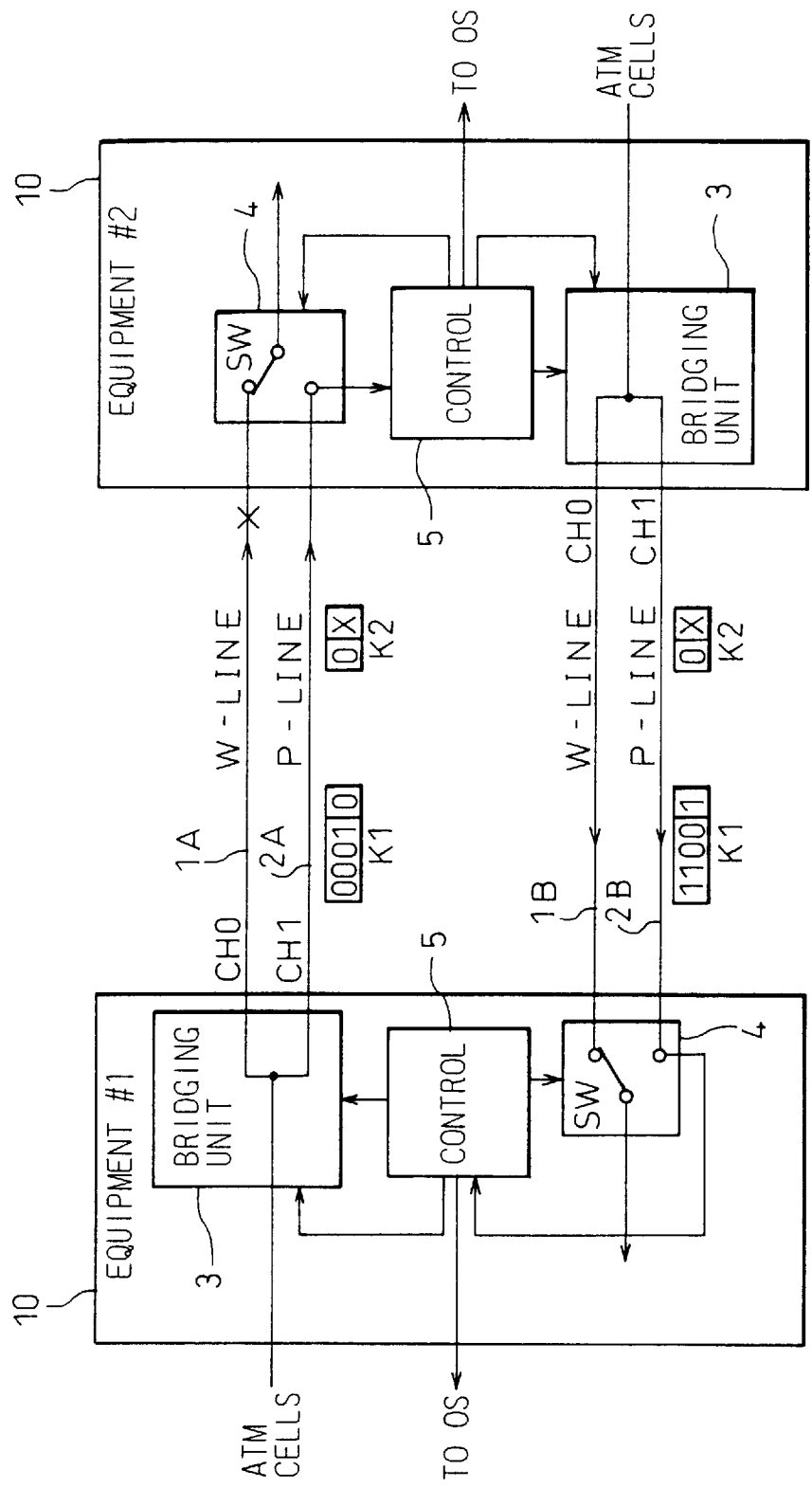

FIGS. 9A, 9B, and 9C are explanatory views of the APS operation and show a case where the APS operation is autonomously performed by the hardware. In the figures, the same elements as those of FIG. 1 are indicated by the same references. An explanation will be made of the different states of FIGS. 9A, 9B, and 9C.

(1) Normal operation state (FIG. 9A)

This is a state where the normal operation, that is, the line concentration function and switching function of the ATM cell, is performed between the first and second equipments 10. In this state, the ATM cell which enters into the bridging unit 3 on the first equipment (#1) side passes through the W-line 1A, enters into the second equipment (#2) side, and goes to the outside after passing through the switch 4. Also the operation of the ATM cell which conversely enters into the second equipment (#2) side is the same. During such an operation, the control means 5 generates the K1 byte and the K2 byte as mentioned before and sends them from the bridging unit 3 to the equipment 10 on the opposing side. On the opposing side (#2), the control means 5 thereof refers to the K1 byte and the K2 byte sent via the P-line 2A. This control means 5 generates a K1 byte and a K2 byte again and sends them out to the opposing equipment (#1). Such an operation is repeated.

In the normal operation state, the control means 5 at the first equipment side places the code "0001" indicating "do not revert" (inhibition of switching) in the request type region in K1 byte (refer to FIG. 2). Further, it places "0 (decimal)" indicating the normal state in the channel region in the K1 byte. Note that, as mentioned before, in the present invention, the W-line is defined as CH No. "0", and the P-line is defined as CH No. "1". This is true also for the K1 byte and the K2 byte which are conversely sent from the second equipment side to the first equipment side. That is, since the CH No. of the received K1 byte is "0", the control means 5 (#2) places the "0 (decimal)" of the same CH No. in the channel region in the transmitting K2 byte and sends this out. Note that the 4 bits of the latter half of the K2 byte are fixed ("101" of FIG. 3) in the present invention, so indicated by a mark x.

(2) Failure occurring state (FIG. 9B)

In the above normal state (1), it is assumed that a disconnection (SF) occurs in the W-line 1A (mark x in FIG. 9B). The control means 5 at the second equipment (#2) side analyzes the signal from the W-line 1A sent from the first equipment (#1) side and recognizes that the disconnection occurred in the W-line 1A. Therefore, the control means 5 (#2) sets a code "1100" indicating the SF in the request type region in the K1 byte which is to be transmitted and further since that failure occurred in the W-line (CH0), sets "1" expressing an instruction to switch to the P-line (CH1), and transmits this to the first equipment (#1) side (refer to FIG. 2).

(3) Switch change over (FIG. 9C)

When recognizing that the code "1100" indicating the SF is set in the request type region in the K1 byte, the control means 5 on the first equipment (#1) side receiving this K1 byte sets the code "0010" (reverse request—refer to FIG. 4) requesting the switch from the CH0 heretofore to CH1 in the channel region in the K1 byte, and further sets "1", indicating CH1 as that channel. Further, the control means 5 (#1) sets "1", which is the number of channels of the received K1 byte in the channel region in the K2 byte. The K1 byte and the K2 byte set up in this way are transmitted to the second equipment (#2) side.

Since the number "1" of channels in the K1 byte which has been already transmitted by itself and the number "1" of channels in the K2 byte received from the equipment (#1) this time match, the control means 5 on the second equipment (#2) side gives a switching signal to the switch 4 (#2) and changes over that switch contact point from the W-line 1A side heretofore to the P-line 2A side. After changing over this switch 4, the control means 5 (#2) places the code "0001" indicating "do not revert" (inhibit switching) in the request type region in the K1 byte, places the channel number "1" in the channel region, and places "1", which is the channel number of the received K1 byte in the K2 byte, and transmits them to the first equipment (#1) side.

The control means 5 at the first equipment (#1) side receiving these K1 byte and K2 byte gives a switching signal to the switch 4 (#1) since the channel number "1" in the K1 bytes, which are transmitted by itself, match with the channel number "1" in the K2 byte received from the equipment #2 and changes over the switch contact point from the W-line 1B heretofore to the P-line 2B. In this state, the switching from the W-line heretofore to the P-line is completed for the first equipment and the second equipment and they start the communication operation again.

In this way, according to this invention, when the switching control between the active sides and standby sides of the W-line and the P-line is performed, the K1 byte and the K2 byte are compared, a certain bridge switching request is issued to the opposing side, and a certain K2 byte indicating bridge completion is returned with respect to this. When the channel number of the transmitting K1 byte and the channel number of the received K2 byte match, the change over of the switch is performed, whereby a certain APS in the ATM exchange network can be executed.

Note that in the system shown in FIGS. 7A and 7B, the mutual exchange of information is performed between the adjoining individual parts 11 by a not illustrated communication line. Therefore, by notifying detection of a failure to the control means 5 via that communication line, the control means 5 generates the bytes of K1 and K2 and can switch the lines of the active side and the standby side. By adopting such a configuration, a certain switching between the active side and the standby side can be performed.

The above explanation was made with reference to a case of performing the switching from the W-line to the P-line when a failure occurred, but it is necessary to restore the original state when restoring the failure. When a failure occurs, the line in question is placed out of service. Then, when the active side is switched to, the line which is out of service is repaired. By this, the corresponding line can be restored to its normal state. When the restoration is performed, it is necessary to clear the out-of-service state by the method mentioned later. When the out-of-service state is cleared, the restored line returns to the original standby side (SBY side). Here, when detecting that the failure is restored, the control means 5 rewrites the channel information in K1 byte and K2 byte and autonomously switches back from the P-line to the W-line by the hardware. The switch back procedures are the same as the procedures shown in FIGS. 9A to 9C. By adopting such a configuration, the switch back at the restoration of failure can be reliably performed.

An explanation was made above of a case where the switch back is autonomously performed by hardware, but it is also possible to autonomously switch back by software. In this case, when an APS failure is restored, the software controlled command is externally given to the control means 5 (for example by the input through the keyboard by the operator via the operating system) and the request type information in the K1 byte is rewritten, whereby the switch back from the P-line to the W-line can be autonomously performed by software. By adopting such a configuration, the switch back at the restoration of the failure can be reliably performed.

The mode used in the present invention is the 1+1 bidirectional mode as mentioned before and the bridging unit 3 is constituted as a permanent bridge. Therefore, usually a state where a bridge is established at both of the P-line and the W-line is exhibited. Accordingly, the completion of the bridge (CH No. in the K2 byte) can be immediately sent. Note, Bridge is not formed to any individual part which is in the out-of-service (OUS) state and therefore the bridge completion message is not sent to the individual part of that CH No.

Figure 10:
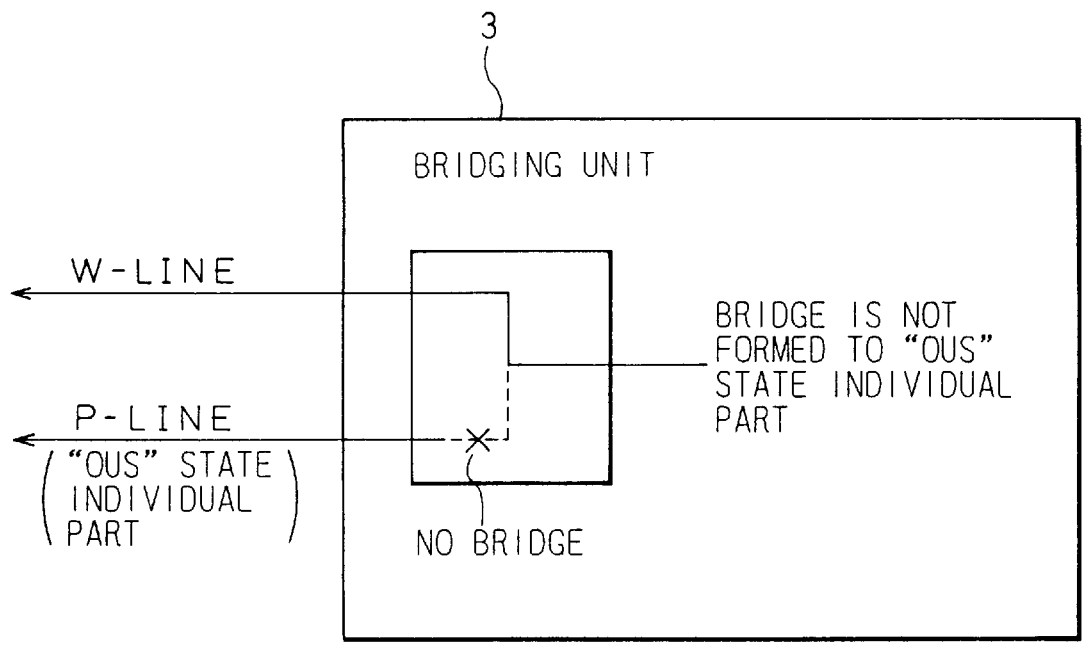
FIG. 10 is a view of a state where a bridge to an out-of-service (OUS) individual part is opened.

FIG. 10 shows a state where a bridge to the individual part of the OUS state is opened. By adopting such a configuration, the individual part put out of service is removed from the system, and the reliability of the operation of the system can be enhanced.

Figure 11:
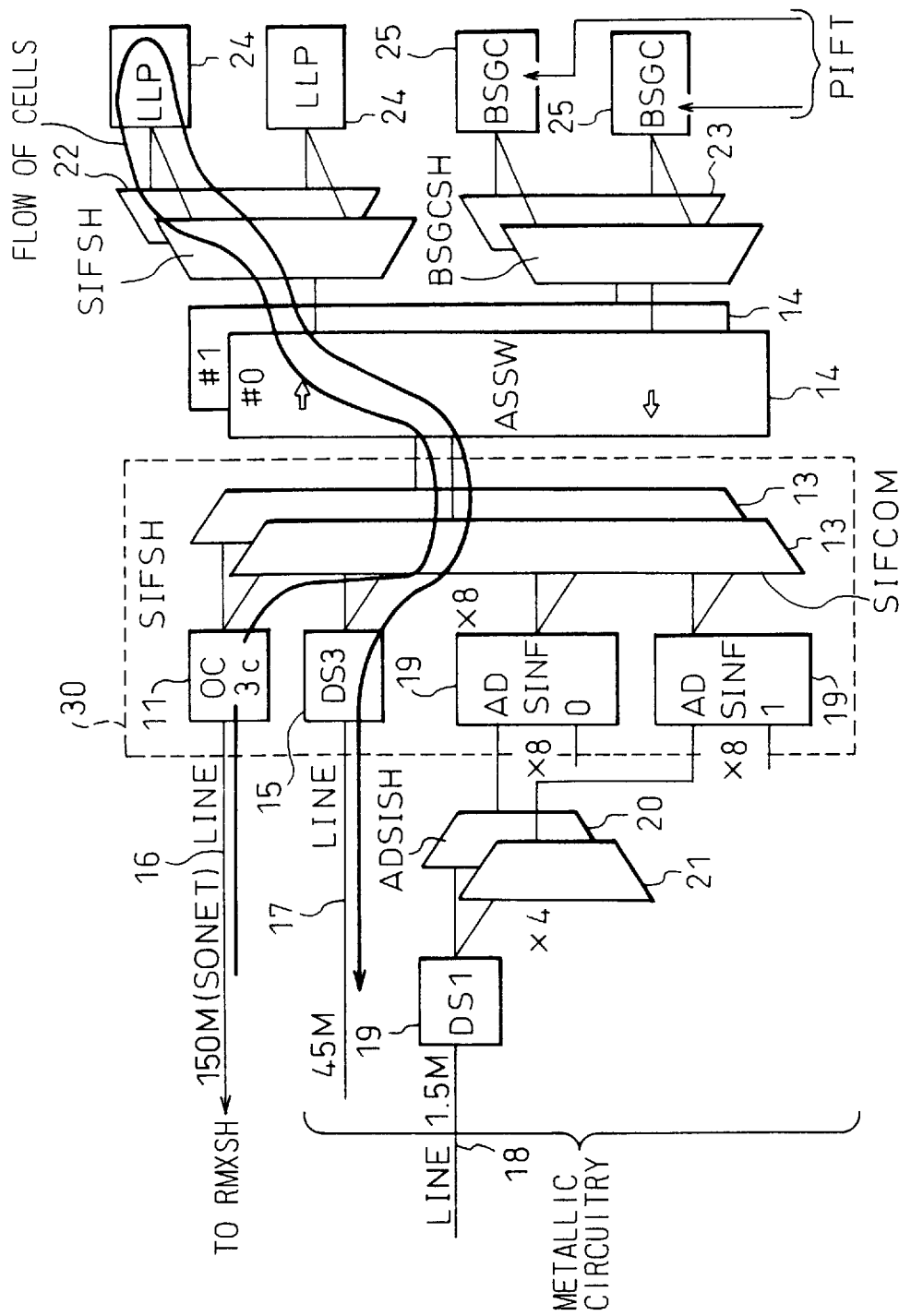
FIG. 11 is a block diagram of an example of the concrete system configuration of the present invention.

FIG. 11 is a block diagram of a concrete example of the system configuration of the present invention and shows the configuration of the host office side. The same elements as those in FIGS. 7A and 7B are indicated by the same symbols. In the figure, 30 is a shelf (SIFSH) constituted by individual parts and the common part. The shelf 30 is a subscriber's shelf on which 8 units of subscriber interface lines (individual parts) of the ATM exchanger can be mounted at the maximum. In the shelf 30, 11 is the individual part serving as OC3c, and 15 is the individual part serving as the DS3 (electric signal of 50 Mbps). Reference numeral 13 is a common part (SIFCOM) having a line concentration function and, at the same time, performing the distribution of the data coming from the ATM switch, storage of the billing information, etc., and configured in duplex. Reference numeral 19 is an ADSINF (ADS1SH (adapter DS1 shelf) line concentration apparatus) and an adapter in a metallic system. These ADSINF's are connected to the common part 13 in the same way as the individual parts 11 and 15. Then, eight communication lines are connected to each ADSINF 19.

Reference numeral 16 are optical lines connected to a SONET system (synchronous optical network) at a transmission speed of 150 Mbps, and 17 are metallic lines having a transmission speed of 45 Mbps. Reference numeral 18 is a metallic line of 1.5 Mbps, and 19 is a DS1 individual part connected to the line 18. Reference numeral 20 is a shelf (ADS1SH) connected to the DS1 individual part 19. The shelf 20 is connected to the ADSINF 19.

Reference numeral 14 is an ATM switch (ASSW) and has a duplex structure of #0 and #1. Reference numeral 22 is a subscriber interface shelf (SIFSH) connected to the ATM switch 14, and 23 is a broad-band signaling controller shelf (BSGCSH) similarly connected to the ATM switch (ASSW) 14. The configurations of the shelves 30, 22, and 23 are the same. Reference numeral 24 is a line loop package (LLP) for loopback connected to the shelf 22, and 25 is a control use individual part connected to the shelf 23. To the control use individual part 25 is input the control signal from a peripheral interface (PIFT) which is then notified to the equipment 10. The control command from the operating system is input to the shelf 30 by this loop. Since there is no loopback function of an ATM cell in the system, the loop back use line loop package 24 functions as a loopback part performing the loopback of the ATM cell entering from for example the line 16 as indicated by a fat solid line in the figure and for performing the change of connection to the other line 17.

On the shelf 30, other than this, a test cell generating adapter TCGADP (TCGSH adapter) and LOOP (156 Mbps loop unit) can be mounted. The units of OC3c, DS3, and TCGADP are configured as single units, but the ADSINF and LOOP unit are configured in duplex, and where they are mounted on the shelf 30, two units are accommodated as one set structure without failure. Accordingly, four sets of LLP 24 and ADSINF units 19 at maximum can be mounted per shelf. Further, the switch control of the ACT (active)/SBY (standby) sides with respect to the LLP's 24 and the ADSINF units 19 is performed by the SIFSH common part (hereinafter referred to as SIFCOM) 13.

In these configurations, by using the OC3c or OC12c or DS3 as the lines connected to the individual parts, a high speed information transfer can be performed.

Next, an explanation will be made of the configuration of the above shelf 30. The shelf 30 is mounted on the high power frame HPF. Three shelves can be mounted at the maximum. The common part (SIFCOM) 13 is fixedly mounted on the shelf 30. It is then constituted by five boards per side as explained below.

FIG. 12 is a view showing details of the packages constituting the SIFCOM 13 in FIG. 11. The HPTO1A denotes a power unit of −48V and supplies the power to the units shown in FIG. 13.

Figure 13:
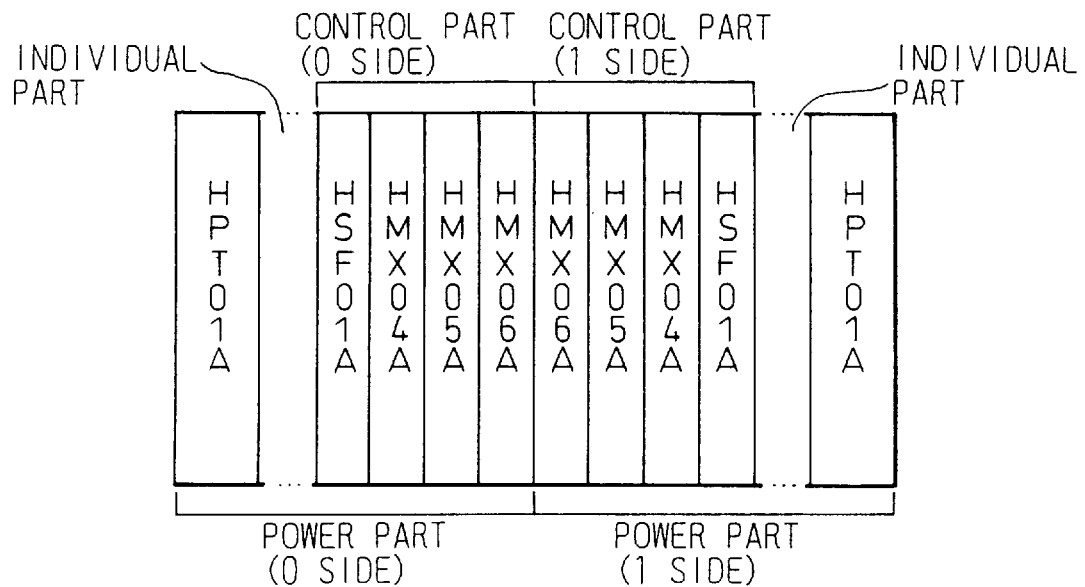
FIG. 13 is a view of an order of mounting packages constituting the SIFCOM.

FIG. 13 is a view of the order of mounting of the packages constituting the SIFCOM in FIG. 12. In this figure, an SIFCOM of a duplex structure of a 0 side (#0) and a 1 side (#1) is shown. At the two ends of the shelf, the power unit HPTO1A is arranged. It supplies power to the units of the circuitry it covers. As apparent from the figure, other than the common part, also individual parts of #0 and #1 sides are mounted in the shelf. The power is supplied to also these individual parts from the power units HPTO1A at the two ends of the shelf.

Next, an explanation will be made of the structure of the individual parts.

Figure 14:
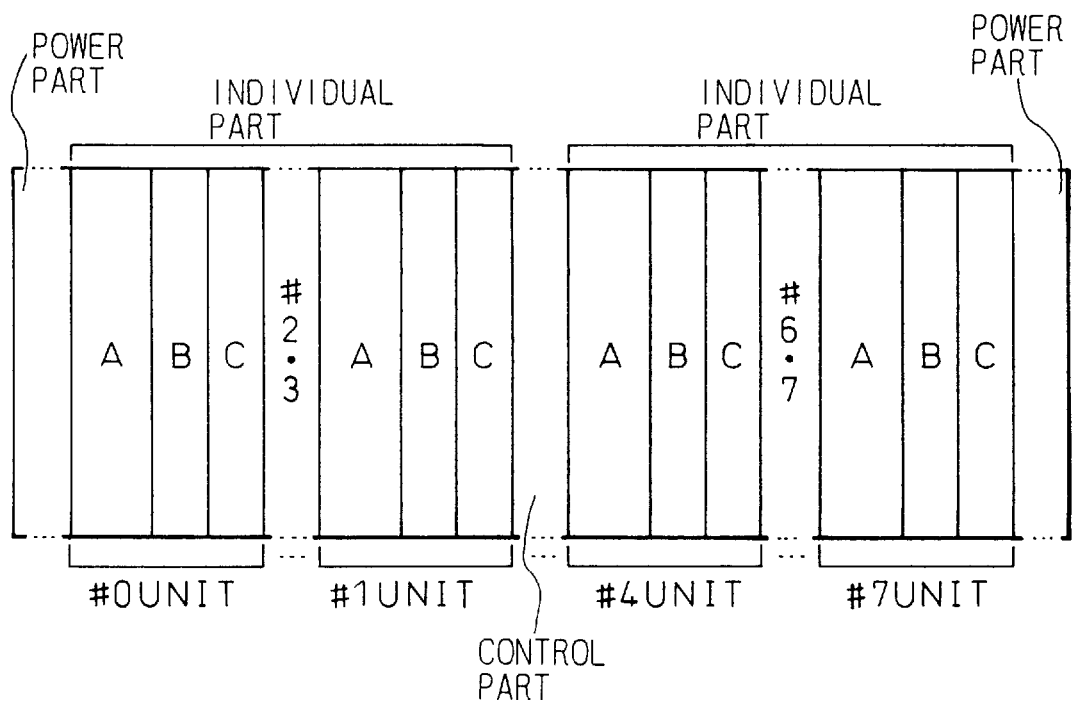
FIG. 14 is a view of an order of mounting individual parts.

FIG. 14 is a view showing the order of mounting of the individual parts. Eight units from #0 to #7 are mounted in order from the left. Eight units of individual parts can be mounted in the shelf 30 at the maximum. Each individual part is constituted by 3 packages per unit. Three slot numbers are defined as slots A, B, and C from the left.

FIG. 15 is a view of an example of the configuration of the shelf as a whole and explains in further detail the configuration shown in FIG. 13. That is, the common part of the 0 side and 1 side and the 8 individual parts are mounted in one shelf 30. Then, to the common part of the 0 side and the individual parts of from #0 to #3, power is supplied from the power unit HPTO1A mounted on the left end. To the common part of the #1 side and the individual parts from #4 to #7, power is supplied from the power unit HPTO1A mounted on the right end.

Then, the active side members (ACT side) and standby side members (SBY side) among these individual parts are combined. For example, the combination of the W-line and the P-line is fixed in such a manner that two sets of the individual part of #0 and individual part of #4 are paired, and two sets of the individual part of #1 and individual part of #5 are paired. Due to such a configuration, the design of the system can be facilitated.

Alternatively, where a plurality of individual parts exist, it is also possible to freely set the combinations of the W-lines and the P-lines by pairing two sets of individual parts. When constituting the invention in this way, the combinations of the individual parts can be changed in accordance with the conditions requested by the office.

Next, an explanation will be made of the interface between the common part and the individual parts. First, an explanation will be made of the control of the individual parts.

Figure 16:
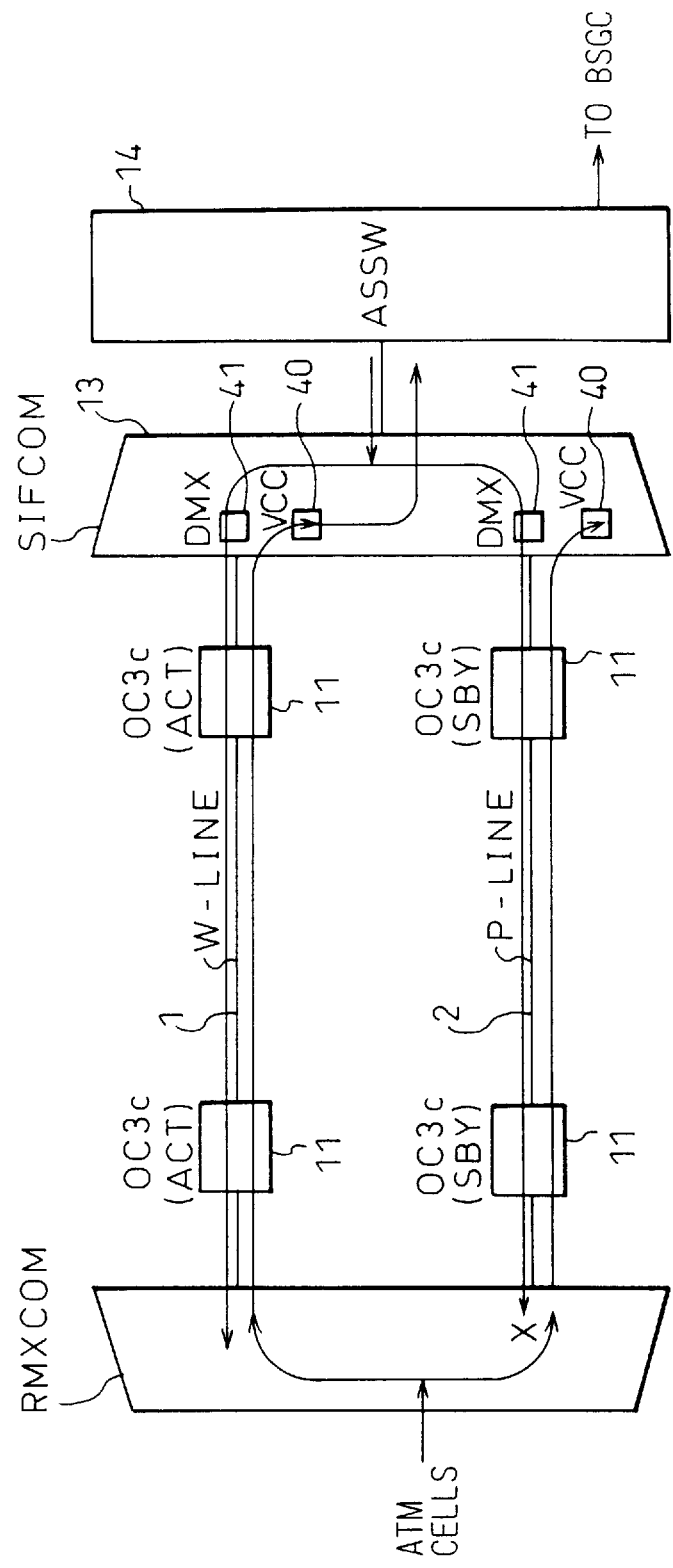
FIG. 16 is a view of the state of flow of cells along a W-line and a P-line.

FIG. 16 is a view of the state of flow of the cells along the W-line and the P-line. The same elements as those in FIGS. 7A and 7B are indicated by the same references. In the system shown in FIG. 16, the host office and the remote office are connected via the W-line 1 and the P-line 2. In FIG. 16, 40 is a virtual channel controller (VCC) provided in the host office side common part (SIFCOM), and 41 is a demultiplexer (DMX) similarly provided in the host office side common part (SIFCOM). These virtual channel controller 40 and demultiplexer 41 are respectively provided corresponding to the active side (ACT side) and standby side (SBY side).

The ATM cells (user cells) transmitted from the ATM switch (ASSW) 14 and the signaling cells (cells concerning the APS or the cells for controlling the equipment 10) generated at the host office side common part (SIFCOM) 13 pass through the W-line 1 and the P-line 2. For this reason, it is necessary to discriminate the user cells from the signaling cells in a certain form.

Further, the individual parts (line corresponding unit, here, OC3c) 11 respectively provided on the host office (right) side and remote office (left) side in FIG. 16 allow only cells routed to themselves to pass therethrough. For example, the down highway cells to the OC3c to be accommodated in the host side shelf are multidropped to the W-line and the P-line at the demultiplexers (DMXs) 41 in the common part 13, and therefore the individual VPI/VCI number in accordance with the accommodation position in the shelf is allotted to OC3c, and only the signaling cell to which the corresponding VPI/VCI number is allotted is taken. Here, VPI is a virtual path identifier, and VCI is a virtual channel identifier. These identifiers are parameters for allotting ATM cells for respective routes. Note that, they are multidropped, and therefore two of the same user cells arrive at the remote office from the W-line and the P-line, but the cell of the SBY (standby) side is stopped at the mark x in the figure.

Further, the up highway signaling cells transferred from the OC3c, to be accommodated in the host side shelf, to the common part 13 have become cells added with "zero" bits (inter-office cell discrimination bits) for discriminating the user cells and the signaling cells from the remote office side respectively transferred through the W-line and the P-line. This "zero" bit is added to for example the initial bit of the header portion of the ATM cell. By this, it can be discriminated whether the up highway cell is a user cell or a signaling cell. Accordingly, the control means 5 on the host side extracts only the cells added with the "zero" bit and can use the same for the APS control. Note that, this "zero" bit is erased by the virtual channel controller 40 provided at the host side common part 13 and transmitted to the BSGC (refer to 25 of FIG. 11), therefore the signaling cells of "zero" bit on/off are not mixed in the ATM switch 14. Further, by using the bit indicating whether it is the ACT side or SBY side when performing the control of the individual part 11, the switching of the duplex can be performed. Note that, in OC3c, a cross connection is established between the W-line and the P-line.

Next, an explanation will be made of the initialization procedure of the host office and the remote office.

Figure 17:
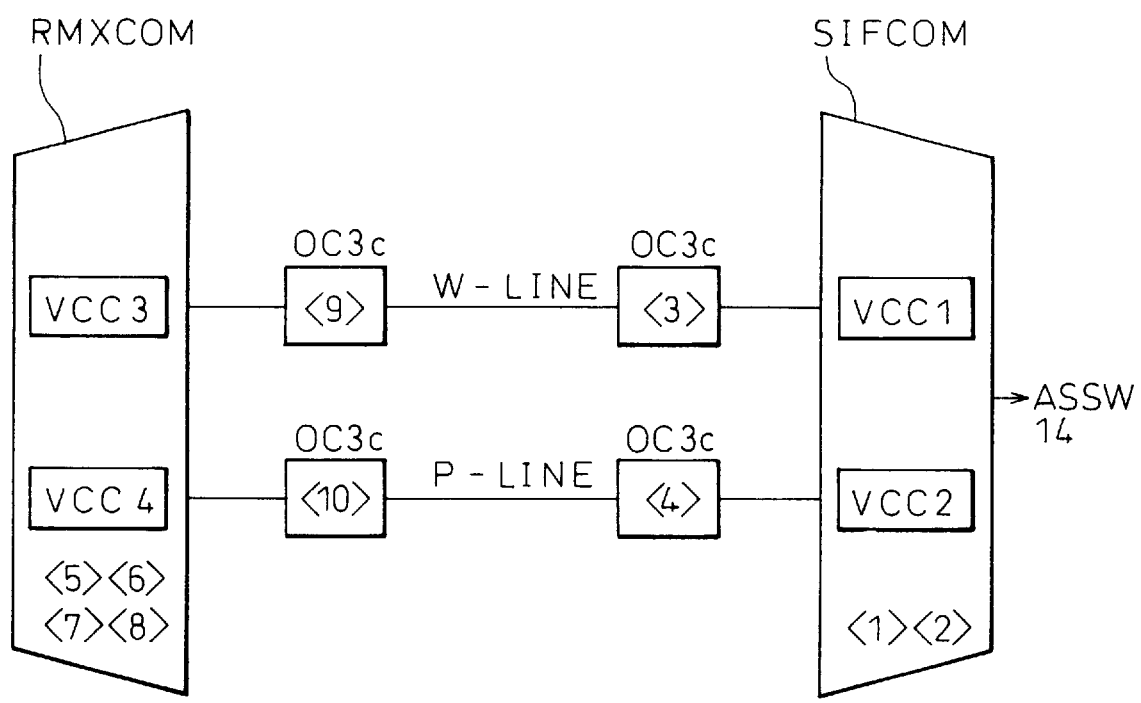
FIG. 17 is an explanatory view of an initialization procedure.

FIG. 17 is an explanatory view of the initialization procedure. The initialization is performed from the remote office side at first. Namely, the activation command of the APS is output by the shelf of the remote office. Next, the shelf of the host office side is activated. In this case, when the APS is activated on the remote office side, the up highway cells are multidropped, and therefore they are returned in duplex from the W-line and the P-line. In this case, one is ignored on the software side.

The VPI/VCI numbers to be allotted to the respective individual parts are set so as to be numbers different from each other among the individual parts at the initialization of the individual part. The VPI/VCI table as shown in FIG. 18 is contained in the virtual channel controller on the host side, and VPI/VCI numbers allotted to the respective constituent elements as shown in the figure are determined as shown in FIG. 18. VPI/VCI numbers of FIG. 17 and VPI/VCI numbers of FIG. 18 correspond to each other. For example, <5> of FIG. 17 and <5> of FIG. 18 correspond to each other. At the APS activation, the setting number is changed also for the VPI/VCI number of the common part.

For example, the virtual channel controller on the host side is set so that the signaling cells of "3" to "10" are allowed to pass at the virtual channel controller 1 and virtual channel controller 2. The above "zero" bit is set in both of the signaling cells from two OC3c connected to the SIFCOM, therefore these bits are respectively dropped at the virtual channel controller 1 and virtual channel controller 2 and transferred to the ATM switch (ASSW) 14 of the latter stage. In the setting of the virtual channel controller with respect to each OC3c connected to the RMXCOM at the remote office side, since a "zero" bit is established in the signaling cell, this bit is dropped at virtual channel controller 3 and virtual channel controller 4 and the cells are returned to the host (SIFCOM) side.

By adopting such a sequence, the respective initializations at the host office and the remote office can be reliably performed.

FIG. 19 and FIG. 20 are views showing an example of the sequence for performing the initialization of the SIFCOM (host side common part). The host side common part is duplexed. Note, the sequence of only the ACT side between them is indicated. In the figure, a broad-band CPR (BCPR) denotes a call processor (CPR) on the operating system side, BSGC a control-use individual part (refer to FIG. 11), SIFCOM hot side denotes an ACT side, and SIFCOM opposing side denotes the SBY side of the host side common part, respectively.

FIG. 21 and FIG. 22 are views showing an example of the sequence of initializing the SIFCOM and shows the sequence of the SBY side. In the figure, SIFCOM master side indicates the ACT side.

Figure 24:
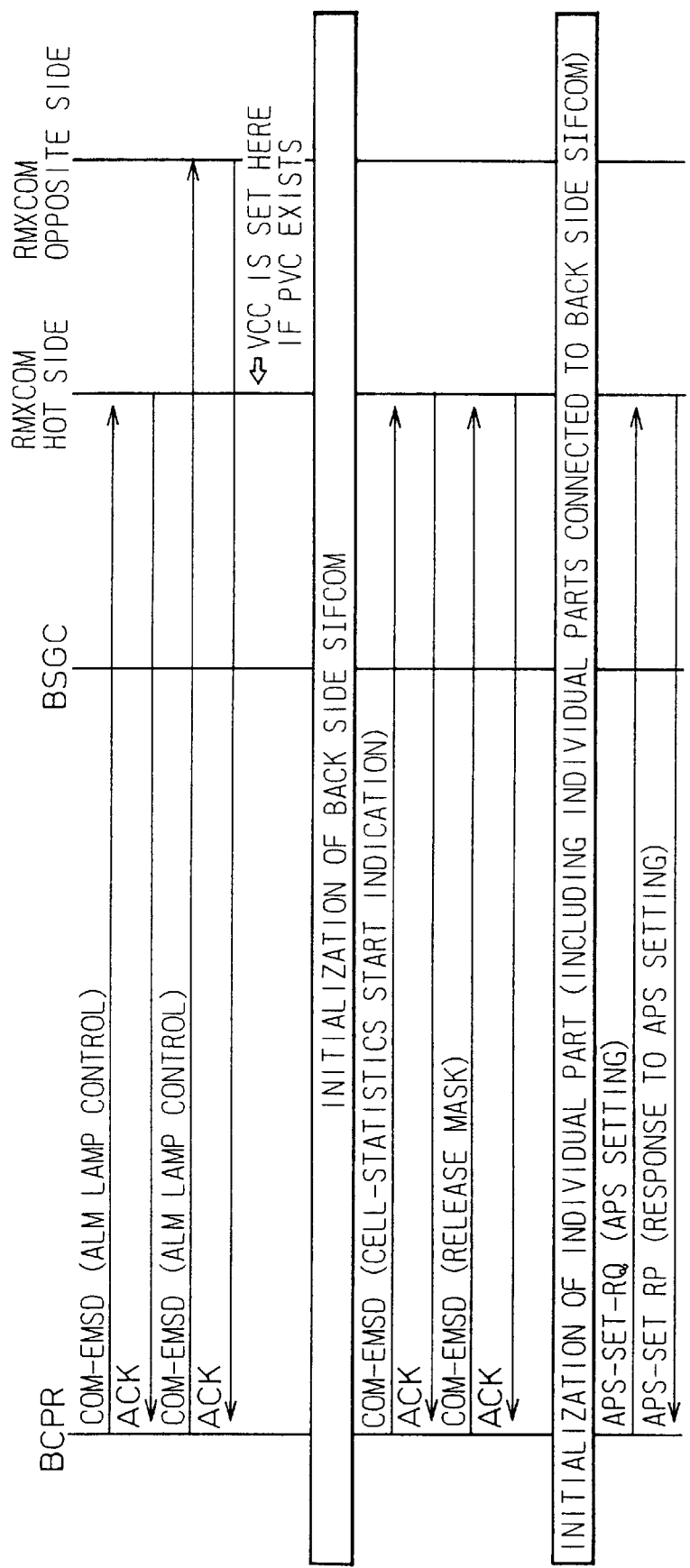
FIG. 24 is part 2 of a view of an example of the sequence for initializing a remote multiplexer common part (RMXCOM)

FIG. 23 and FIG. 24 are views of an example of the sequence for initializing the RMXCOM (remote side common part) and shows the sequence of the ACT side. RMXCOM hot side indicates the common part of the ACT side. The RMXCOM opposite side indicates the SBY side of the remote side common part.

Figure 25:
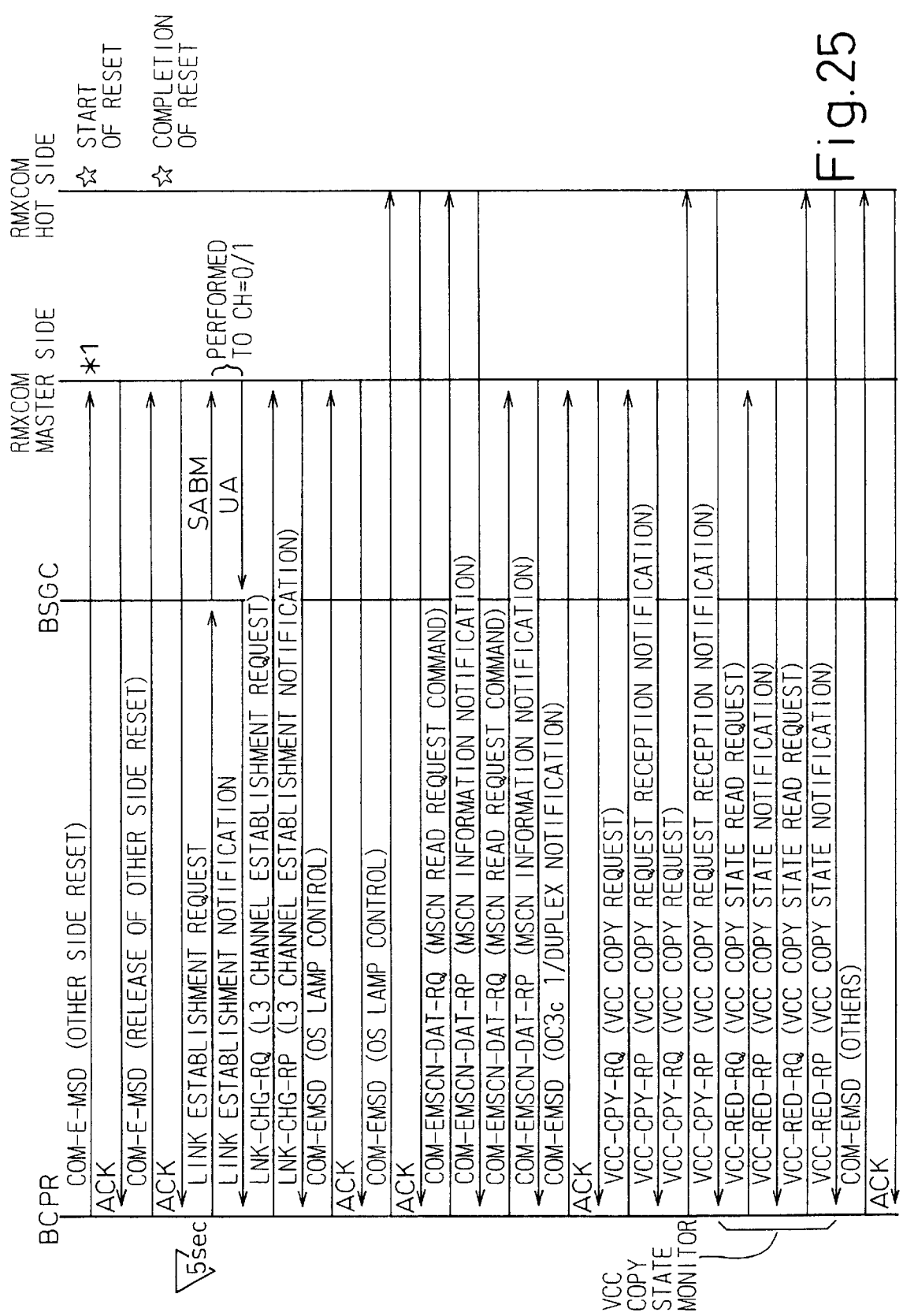
FIG. 25 is part 3 of a view of an example of the sequence for initializing a remote multiplexer common part (RMXCOM)
Figure 26:
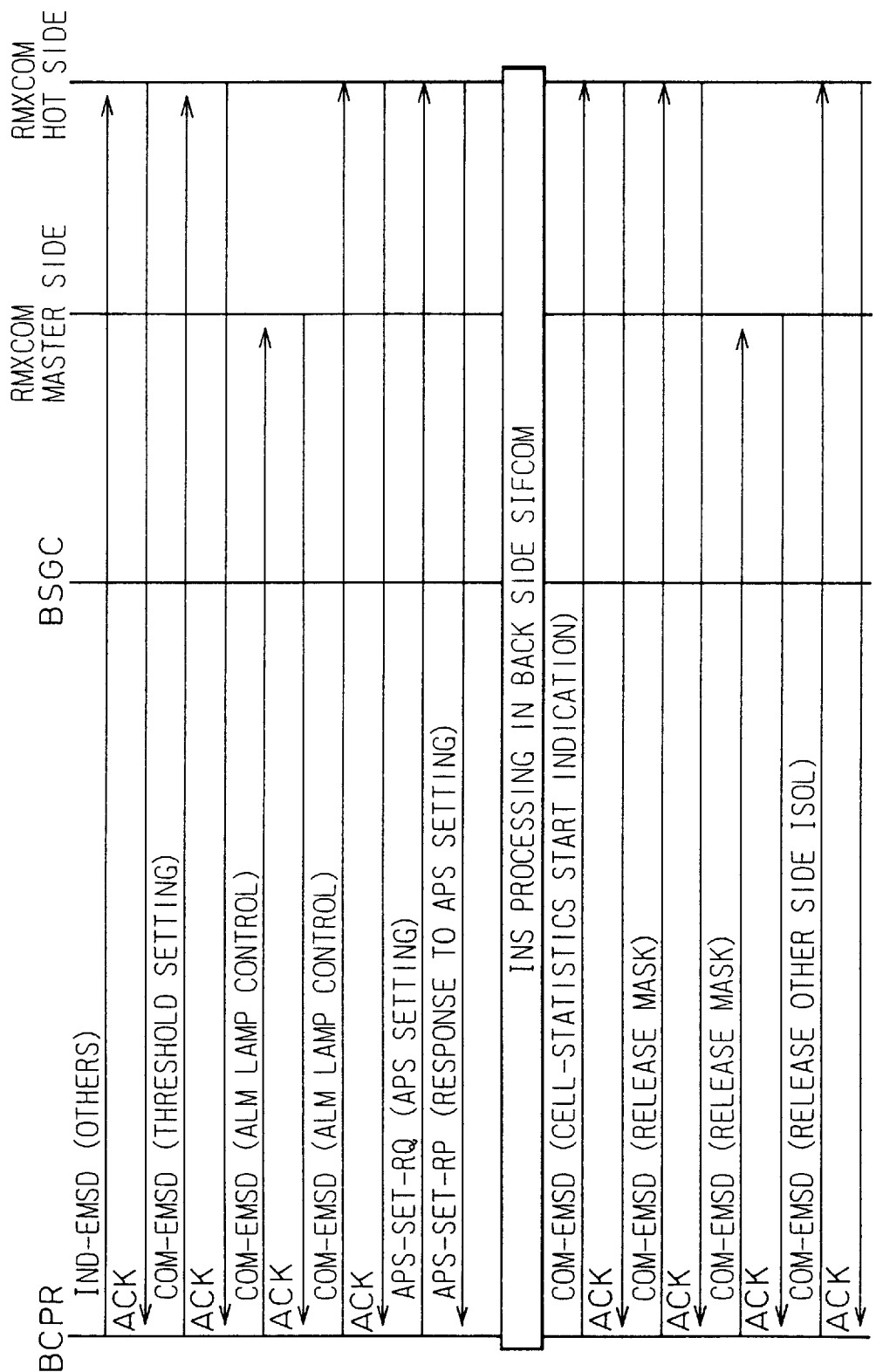
FIG. 26 is part 4 of a view of an example of the sequence for initializing a remote multiplexer common part (RMXCOM)

FIG. 25 and FIG. 26 are views of an example of the sequence of initializing the RMXCOM (remote side common part) and shows the sequence of the SBY side. The RMXCOM master side indicates the remote side common part of the ACT side.

Figure 27:
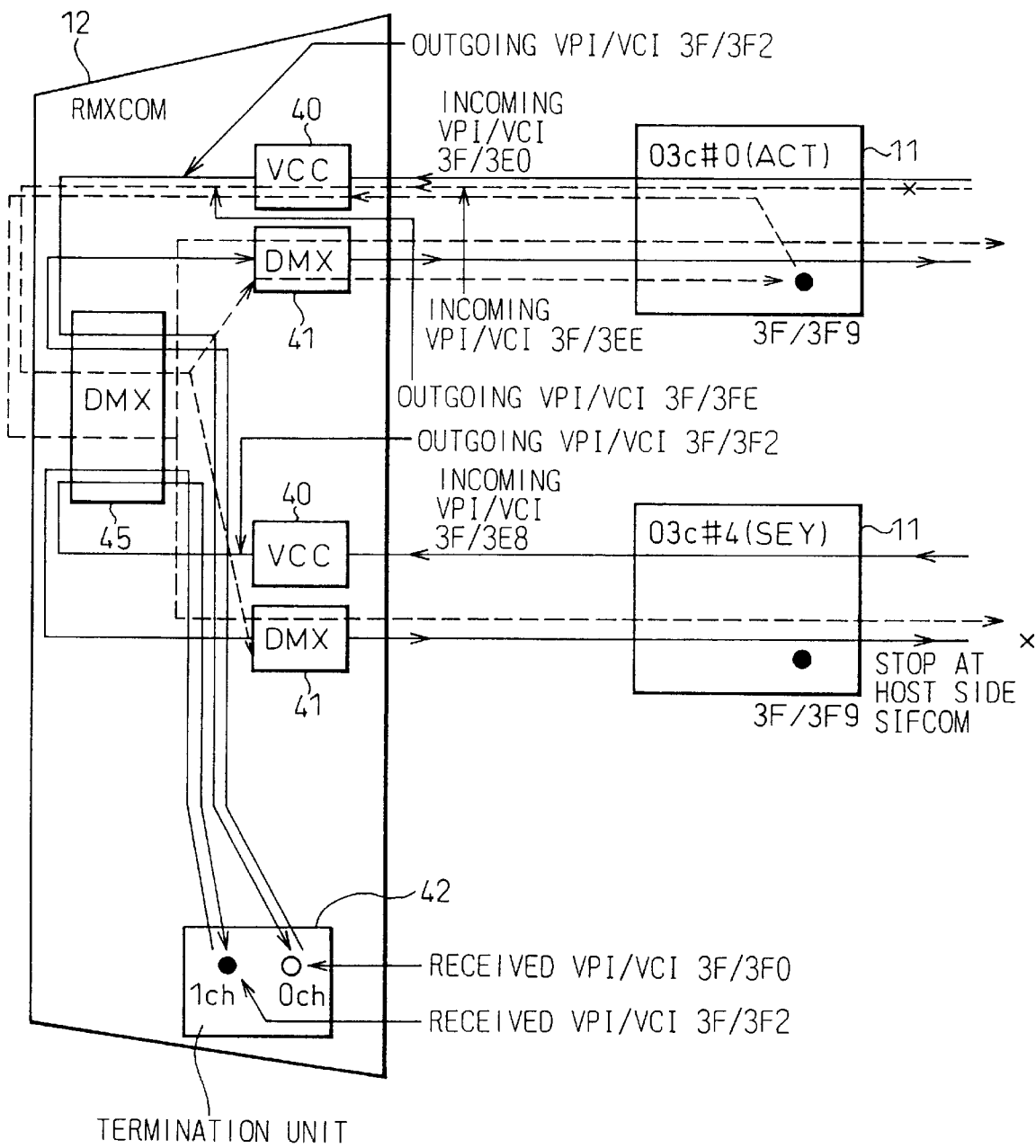
FIG. 27 is a view of the flow of establishment of a link at a remote side common part.

FIG. 27 is a view showing the flow of the establishment of a link of the remote side common part. The same elements as those in FIG. 16 are indicated by the same references. In FIG. 27, 40 is a virtual channel controller (VCC), 41 is a demultiplexer (DMX), 42 is a termination unit, and 45 is a demultiplexer (DMX).

To the remote side common part (RMXCOM) 12, two OC3cs 11 of the ACT side and SBY side are connected. As explained referring to FIG. 14, in the individual part 11, 8 units of from #0 to #7 are mounted in one shelf. Then, units of #0 and #4 form a pair, and which are respectively constituted by the ACT side and SBY side. In FIG. 27, a situation such that the respective signals of the 0-CH and 1-CH flow is shown. For example, in the signal of 0-CH notified from the host side, only the cells to which the prescribed VPI/VCI value is allotted at OC3c of #0 can pass and enter into the virtual channel controller in the common part 12. In the signals entering into the virtual channel controller, only cells to which the prescribed VPI/VCI value is allotted can pass and reach the termination unit 42 after passing the demultiplexer 45. On the other hand, the cells transmitted from the termination unit 42 enter into the DMX41 after passing the demultiplexer 45 and only cells to which the prescribed VPI/VCI value is allotted can pass and are notified to the host side through the OC3c of #0. An explanation was made above of the 0-CH, but it is the same also for 1-CH.

Next, an explanation will be made of the operation for the respective APS settings of the common part of the host office and the common part of the remote office. First, a command COM-EMSD (common part-extended maintenance SD) for designating duplexing for the common part of the host office is given from the operating system. By giving this command, a bit (DMX TAG C) indicating any of 8 individual parts in the ATM header is returned to a certain fixed value (default value) for the unit, the duplexing is designated with respect to the I/O (input/output) interface between the software and the firmware/hardware, the MACT (ACT side of individual part) is set, the duplexing with respect to the individual parts is set, and the W-line or P-line is designated.

By adopting such a sequence, the APS can be reliably set with respect to the host side common part.

Next, when the APS service is started from the operating system, the service start command APS-SET-RQ is given to the host office common part. By this, the DMX TAG C is multidropped, and the MACT is reestablished. When the APS service is stopped, a service stop command APS-SET-RQ is given from operating system to the common part. By this, an IND-EMSD (individual part-extended maintenance SD) command is given to the individual part, and "FF" is respectively set in the K1 byte and the K2 byte. Further, the DMX TAG C is restored to the fixed value for the unit.

Further, there also exists a case where a single configuration (not duplex) is desired according to the user. In this case, a single configuration is designated for the common part from the operating system by the COM-EMSD command. By this, the IND-EMSD command is given to the individual parts, and a single configuration of the individual parts is established. Also, the I/O is also configured singularly and also the DMX TAG C is cleared.

Next, an explanation will be made of the operation for setting the APS in the common part of the remote office. First, the command COM-EMSD for designation of duplex for the common part of the remote office is given from the operating system. By giving this command, the MACT for determining the ACT side of the individual parts is set, the duplexing of the individual parts is designated, and the DMX TAG C is multidropped.

By adopting such a sequence, the APS can be reliably set for the common part of the remote office.

Next, when the APS service is started from the operating system, the service start command APS-SET-RQ is given to the common part of the remote office. By this, the MACT is reestablished and the duplexing is set with respect to the I/O. When the APS service is stopped, the service stop command APS-SET-RQ is given from the operating system to the common part of the remote office. By this, the IND-EMSD command is given to the individual part, and "FF" is respectively set in the K1 byte and the K2 byte. Further, the MACT is set and returned to the W-line, and the duplexing of the I/O is set.

Where the common part of the remote office is to be configured singularly, a single configuration is designated from the operating system to the common part of the remote office by the COM-EMSD command. By this, the DMX TAG C is cleared.

Further, in order to restore the APS state at the time of restoration from a failure of duplex occurring in the common part, the contents of the APS-SET-RQ message are determined as follows in accordance with the timing of transmission thereof.

<1> APS-SET-RQ1: The APS information contained in the message is set at the message reception side.

<2> APS-SET-RQ2: The message reception side sets the APS information of the other side in the home side.

<3> APS-SET-RQ3: The message is set with respect to both sides.

The specific method of usage is as follows.

(1) In order to set the APS during the incorporation of a master (restoration from failure of duplex at initialization), the APS is set by using the APS-SET-RQ1. This APS-SET-RQ1 is issued with respect to the master side.

(2) In order to set the APS during the incorporation of a slave (at the time of creating INS), the APS is set by using the APS-SET-RQ2. This APS-SET-RQ2 is issued with respect to the slave side.

(3) The APS in the master/OUS (out-of-service) state is set by using the APS-SET-RQ2. This APS-SET-RQ2 is issued with respect to the master side.

(4) The APS in the master/slave state is set by using the APS-SET-RQ3. This APS-SET-RQ3 is issued with respect to the master side. By adopting such a sequence, even if a duplexing failure of duplex occurs in the common part, the APS can be reliably set.

Figures 28A, 28B, 28C:
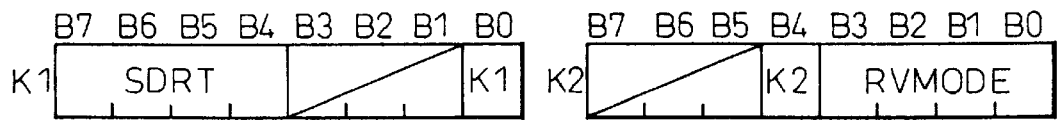
FIGS. 28A, 28B, and 28C are explanatory views of a command used between the common part and an individual part in a host office.

FIGS. 28A, 28B, and 28C are explanatory views of the commands used between the common part of the host office and the individual parts of the host office. In these figures, a bit map state of 8 bits is shown. As the commands to be used, there are an MSD and an MSCN. The MSD indicates one in the transmitting K1 and K2 bytes, and the MSCN indicates one in the received K1 byte and K2 byte, respectively. The explanation of the words shown in the figures are as follows.

INT: Notification for difference between the state heretofore and the current state INFD: Designation of single/duplexing with respect to OC3c (0: duplex; 1: single)

APSET: Designation of W/P with respect to OC3c (0: W, 1: P)

SF: Notification of reception of APS signal failure

SD: Notification of reception of APS signal degrade

SDRT: Designate request type in transmitting K1 byte for APS. The code of the request type is as shown in FIG. 2.

SDK1CH: Designate channel in the transmitting K1 byte for APS

SDK2CH: Designate channel in the transmitting K2 byte for APS

SDMODE: Designate mode of APS in the transmitting K2 byte for APS. "101" is given to SDMODE indicating that the bidirectional 1+1 mode is set, in the present invention.

RVK1CH: Notification of channel by the received K1 byte for APS

RVK2CH: Notification of channel by the received K2 byte for APS

RVMODE: Notify APS mode in the received K2 byte for APS.

RVRT: Notify request type in the received K1 byte for APS. The code thereof is as shown in FIG. 2.

Next, an explanation will be made of the procedure for forming a line out-of-service (OUS) under the APS. When restoring a line on which a failure occurs, it is necessary to place it out-of-service (unusable state). Where the number of APS lines are reduced, it is necessary to take the ACT side out-of-service. For this reason, the following is determined for the out-of-service of both sides in the individual parts connected to the APS line.

(1) Where the SBY side is to be placed out-of-service and when the W-line is to be placed out-of-service, it is placed out-of-service after the switch to the P-line by the forced switch command. When the P-line is placed out-of-service, it is placed out-of-service after setting the "lockout of protection" state. By adopting such a sequence, the SBY side can be reliably placed out-of-service. The line placed out-of-service is restored according to need.

(2) When the ACT side is placed out-of-service, it can not be placed out-of-service in a state other than the state of the following (3).

(3) Where both sides (ACT and SBY) are placed out-of-service, it is performed by the following procedures.

<1> The "lockout of protection" state is set. By this, the P-line becomes the SBY side.

<2> The P-line is placed out-of-service. By this, the P-line becomes OUS (out-of-service).

<3> The W-line is placed out-of-service. By this, the two sides are placed out-of-service.

The order of <1> to <3> is guaranteed by the software. Accordingly, the firmware accepts the request for being placed out-of-service of the ACT side in the state where the SBY side is out-of-service. Further, it becomes impossible to communicate with the opposing side, and therefore the pair of umbilical links are not allowed to be placed out-of-service. Here, "umbilical link" means two communication lines (W-line and P-line) which are at least necessary for connecting the host office and the remote office.

By adopting such a sequence, the both sides can be reliably placed out-of-service.

Further, regarding the conditions for clearing the out-of-service state, there is no particular condition for clearing the out-of-service state of the SBY side, but clearing the out-of-service states of both sides is allowed only by the following procedures:

<1> The out-of-service state of the W-line is cleared. By this, the W-line is changed to ACT.

<2> The out-of-service state of the P-line is cleared. By this, the P-line is changed to SBY.

The order of from <1>→<2> described above is guaranteed by software. Accordingly, where a request for clearing the out-of-service is received, the firmware clears the out-of-service by changing that side to ACT. By adopting such a sequence, the out-of-service state of the both sides can be reliably cleared.

Further, when the common part fails in a state where the individual parts are placed out-of-service, the control means 5 holds the out-of-service state by the software. At the time of restoration of the failure in the common part, the out-of-service state of the individual parts is notified by using the notification of the APS start. By adopting such a configuration, a failure can be reliably restored.

Next, an explanation will be made of the lamp control.

Figure 29:
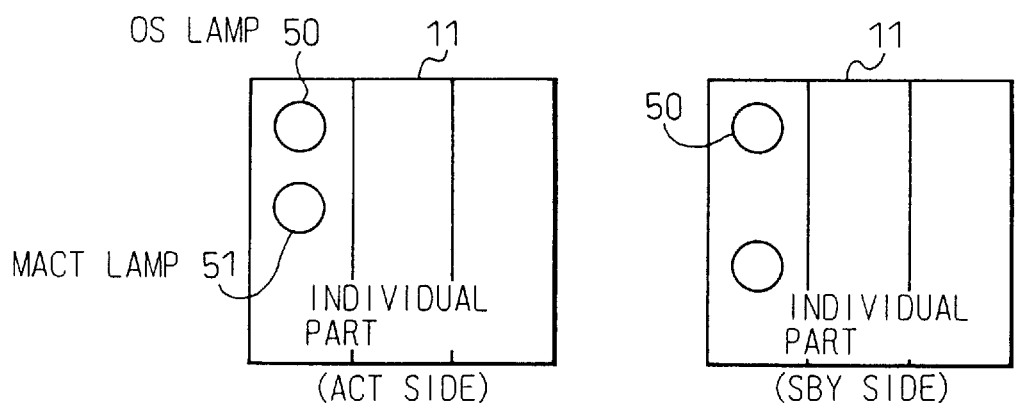
FIG. 29 is a view of an example of the appearance and configuration of individual parts of an active (ACT) side and a standby (SBY) side.

FIG. 29 is a view of an example of appearance and configuration of the individual parts of the ACT side and the SBY side. As mentioned before, three packages of individual parts 11 constitute one unit. An operating system lamp 50 and a MACT lamp 51 are provided in one of these packages. In FIG. 29, an example where these lamps are provided in the package of the left end is shown. As these lamps 50 and 51, for example, an LED is used. The on/off states of these lamps are defined as shown in FIG. 30. The on/off state of these two lamps in the case of the single configuration and duplexing is defined with respect to each of the in-service (INS) state and the out-of-service state. Each individual part turns on/off the operating system lamp 50 and the MACT lamp 51 by the rule shown in the figure in accordance with the state of the APS. This on/off control is performed by the control means 5 or the control unit in the individual part. By adopting such a configuration, the operator can recognize the state of each individual part at the APS control.

Finally, a detailed example of each of the constituent elements particularly relevant to the present invention among the various constituent elements mentioned above will be shown.

Figure 31:
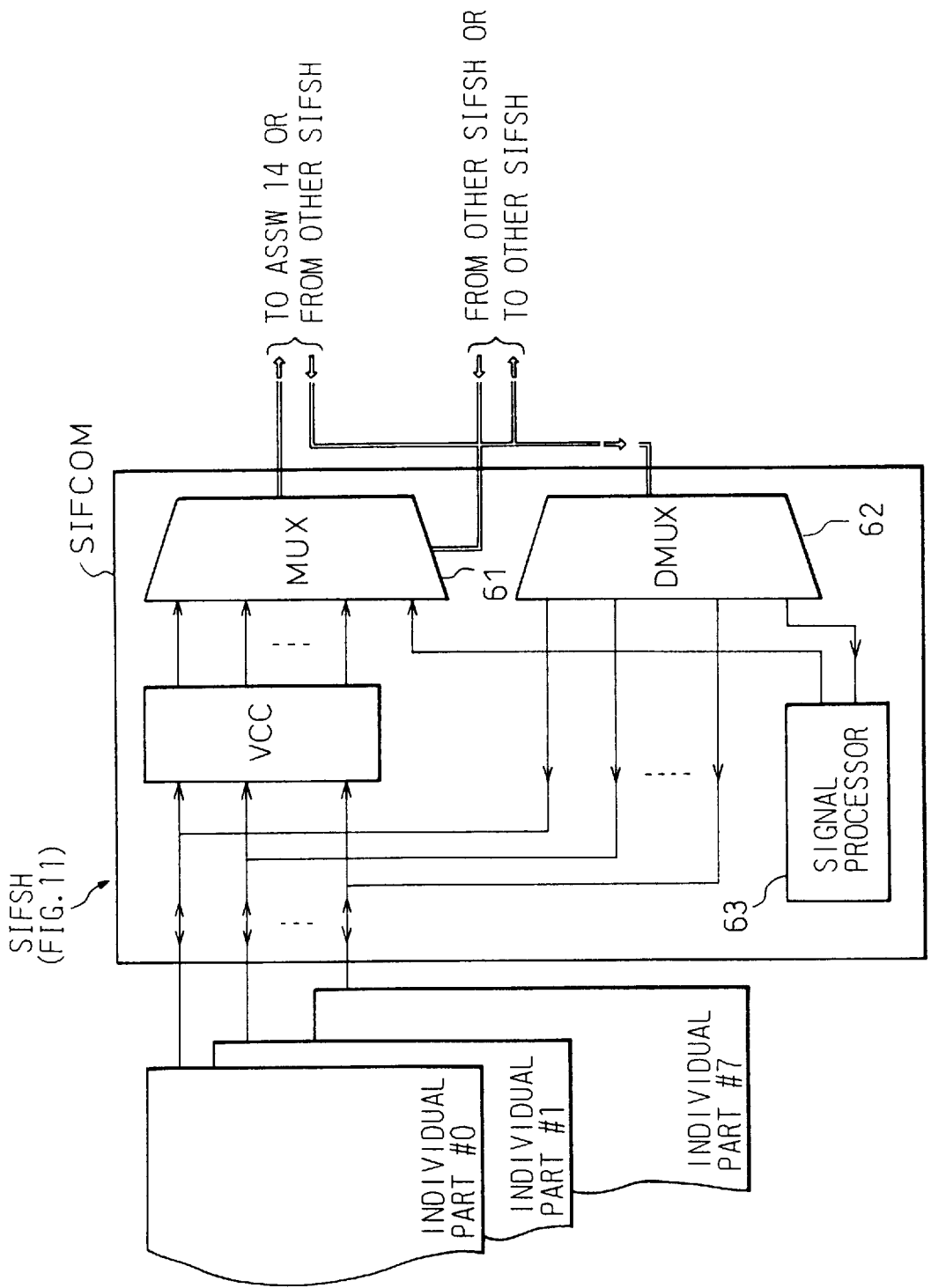
FIG. 31 is a view of a detailed example of the SIFCOM.

FIG. 31 is a view of a detailed example of the SIFCOM 13 shown in FIGS. 7A, 7B, 11, 16, 17, etc. The overall configuration in the figure corresponds to the SIFSH (shelf) shown in FIG. 11.

The SIFCOM 13 is mounted in this SIFSH. This SIFCOM 13 comprises, other than the above virtual channel controller (VCC), a multiplexer (MUX) 61, a demultiplexer (DMX) 62, and a signal processor 63.

The multiplexer 61 multiplexes the data from eight subscribers accommodated in the SIF shelf (SH), that is, the cells after the conversion of the VPI/VCI of the header by the virtual channel controller, and the signaling cells in the common part and sends out the multiplexed cells to the up highway connected to the ATM switch (ASSW) 14.

The demultiplexer 62 separates the down highway data (cells) from the ATM switch 14 or the daisy chain connected upper layer SIFSH to the data to be given to the respective individual parts and the signaling data to be given to the signaling processor 63. Each separated data is identified by the TAG added to the header of the cell constituting the data.

The signaling processor 63 composes or decomposes the signaling cells, defines a LAP-D (link access procedure on the D-channel) formed frame as ATM cells, and realizes the communication by these ATM cells. Note that, although not illustrated, this signaling processor 63 performs the transmission and reception of the LAP-D Layer-2 Frame with the microprocessor via the dual port SRAM.

Figure 32:
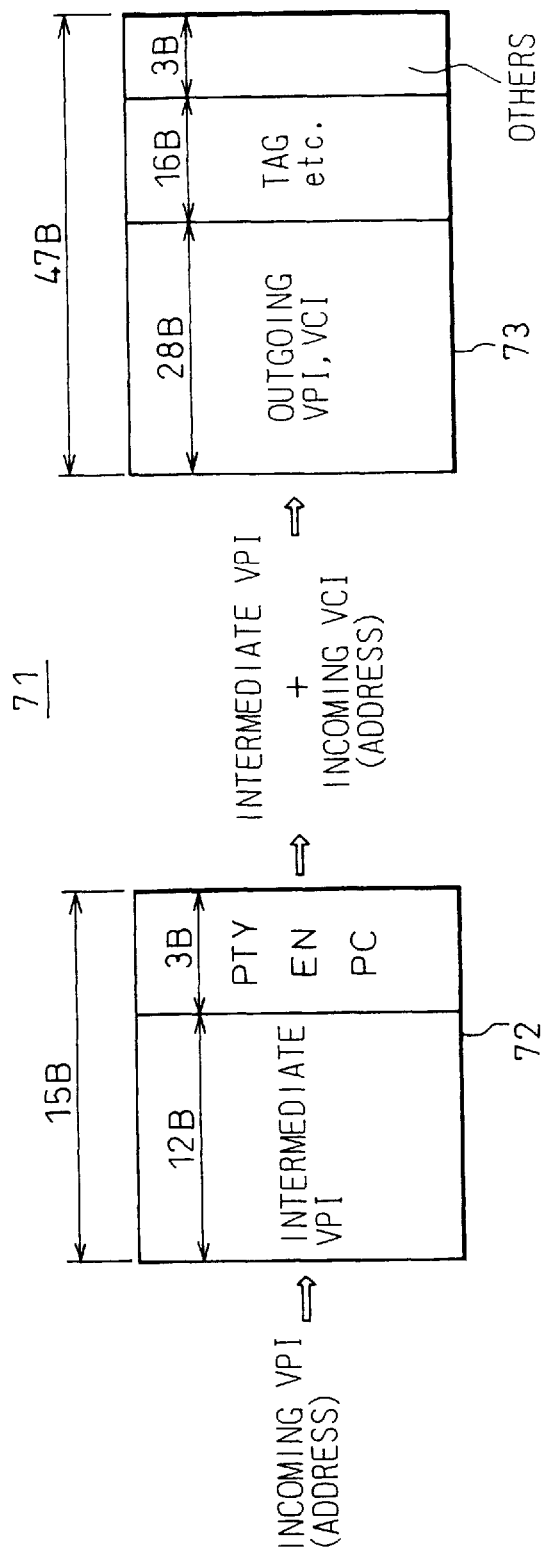
FIG. 32 is a view of a detailed example of a conversion table used in the virtual channel controller (VCC)

FIG. 32 is a view of a detailed example of the conversion table used for the virtual channel controller 40 shown in FIGS. 16, 17, etc. In the figure, the conversion table 71 comprises two memories 72 and 73. The memory 72 has a 15B (bit) configuration of 12B+3B, and the memory 73 has a 47B configuration of 28B+16B+3B.

The memory 72 is accessed by using the incoming virtual path identifier as the address and retrieves an intermediate virtual path identifier. As a result, the intermediate virtual path identifier corresponding to that virtual path identifier is obtained.

This intermediate virtual path identifier is used together with the incoming virtual channel identifier (VCI) for accessing the memory 73, and the outgoing VPI+VCI corresponding to this intermediate VPI+incoming VCI is retrieved.

Figure 33:
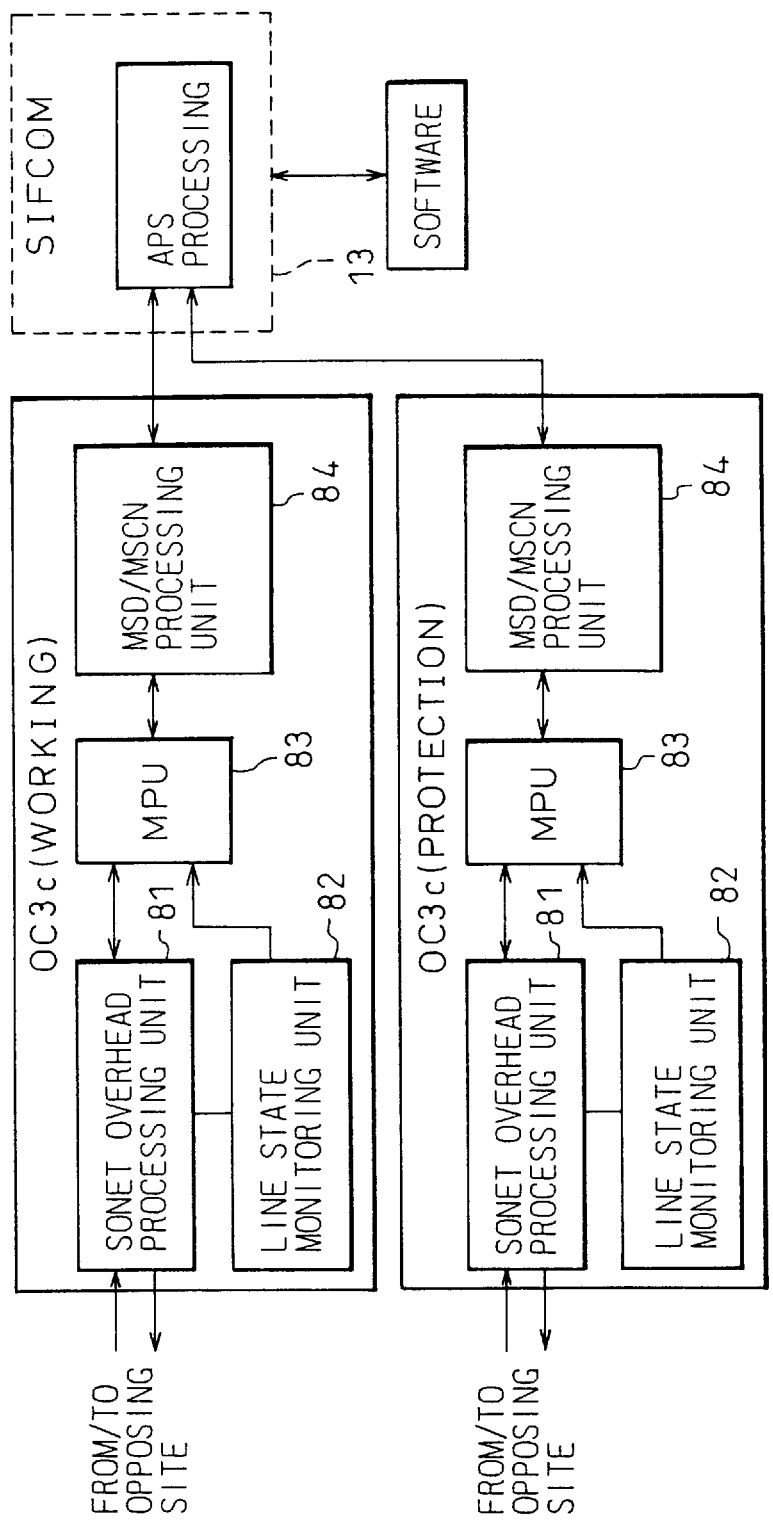
FIG. 33 is a view of a detailed example of the individual part.

FIG. 33 is a view of a detailed example of the individual part (OC3c) shown in FIGS. 7A, 7B, 11, 16, 17, etc. The upper and lower parts of the figure respectively represent the working OC3c and the protection OC3c. The two have the same configuration. Accordingly, the OC3c of the upper part will be referred to.

A maintenance SD/maintenance scan (MSD/MSCN) processing unit 84 issues the APS activation request or transmits and receives the K1 byte and K2 byte between with the SIFCOM 13. That is, it notifies the data in the K1 and K2 bytes received from the opposing equipment 10 (not shown) and an occurrence state of SF (signal failure) and SD (signal degrade) to the SIFCOM 13.

On the other hand, the processing unit 84 receives the data of the K1 and K2 bytes which should be transmitted from the SIFCOM 13 and transmits the same to the opposing equipment.

A SONET overhead processing unit 81 terminates the overhead contained in one group of cells to be transmitted and received and performs the processing in accordance with the content of that overhead. The content of that overhead includes also the information indicating the state of the line. A line state monitoring unit 82 selectively monitors such information.

An MPU 83 controls the above units 81, 82, and 84 as a whole.

FIG. 34 is a view of an example of the format of each control cell used for controlling the individual part (OC3c). This control cell is composed of for example 256 rows (000 byte to 255 byte)×8 bits (D0 to D7) as illustrated. Among them, the one relevant to the present invention is the row 013, which row composes the K1 byte. Note that, the bits of the rows indicated by no symbol and the unused rows are not relevant ("don't care").

The control cell in FIG. 34 contains the command for setting the individual parts. Next, a control cell which is conversely transferred from the individual part (OC3c) to the common part (SIFCOM) is shown in FIG. 35.

FIG. 35 shows an example of the control cell to be sent from the OC3c to the SIFCOM and indicates also the K2 byte other than the K1 byte. This K2 byte is formed in the row 028.

Figure 36:
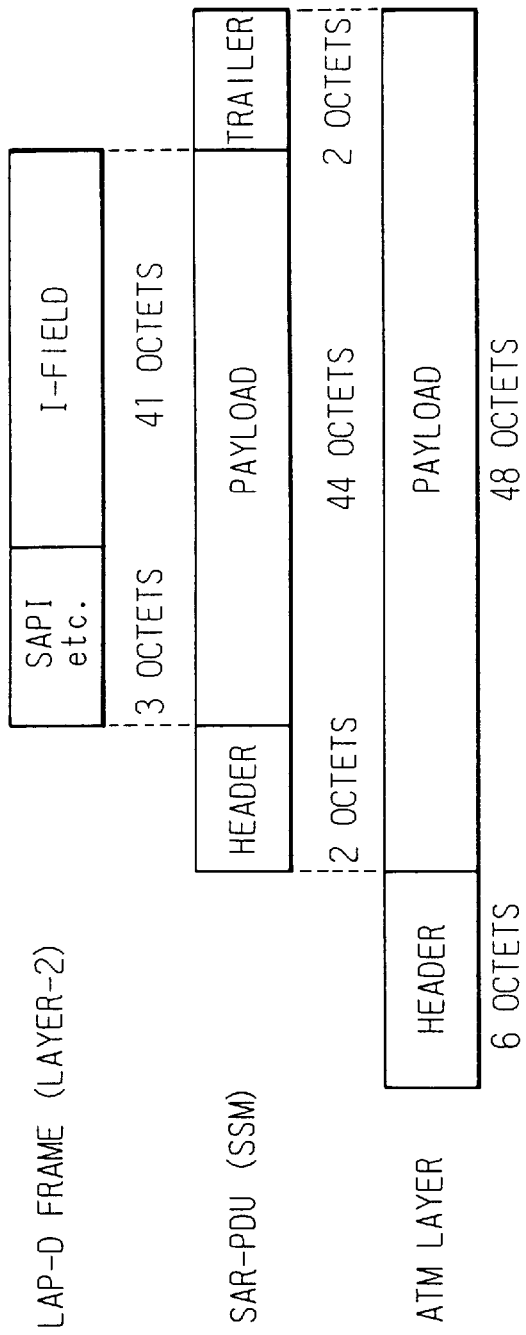
FIG. 36 is a view for explaining a signaling cell.

FIG. 36 is a view for explaining the position allocation in the signaling layer hierarchy to which the information of the signaling cell belongs for a signaling cell.

In the figure, the signaling information contained in the signaling cell is contained in the LAP-D frame of Layer 2. Particularly it is contained in the information field (I-field) in the frame. SAPI is a service access point identifier.

Figure 37A:
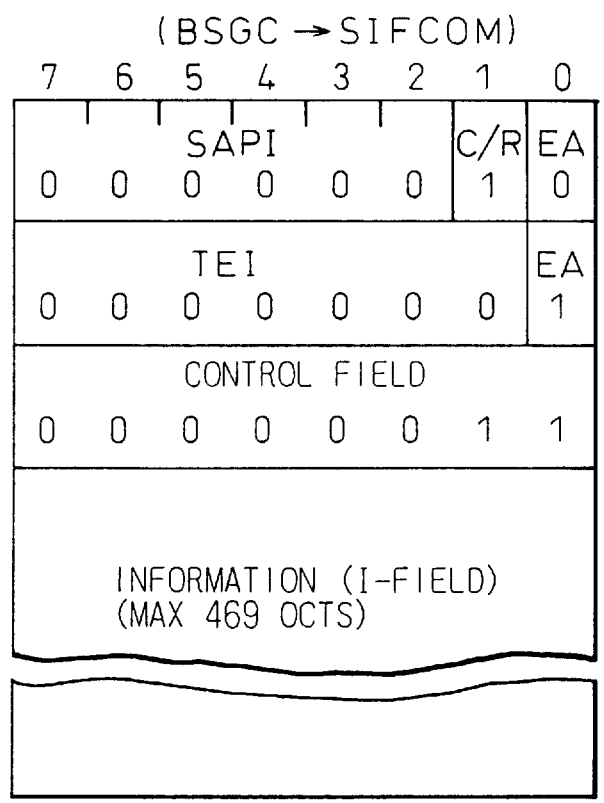
FIGS. 37A and 37B are views of an example of the format of the signaling cell.

FIG. 37A is a view of an example of the format of the signaling cell. This format shows a case of the signaling cell going from the broad-band signaling controller (BSGC) 25 (FIG. 11) to the SIFCOM 13.

Figure 37B:
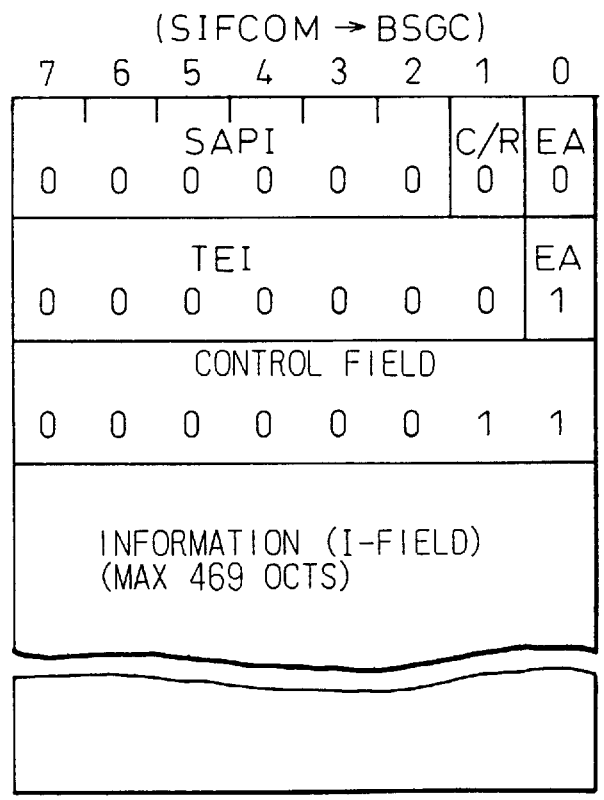

FIG. 37B shows an example of the format of the signaling cell conversely going from the SIFCOM 13 to the BSGC 25. In FIG. 37A and FIG. 37B, SAPI and the I-field are as shown in FIG. 36. C/R represents the command/response. The command is "0" and the response is "1". EA represents the existence/absence of the extended address. TEI represents the terminal equipment identifier.

As explained in detail above, according to the present invention, in an ATM exchange network system in which a first equipment and a second equipment are connected by a duplex communication line comprising a working line and a protection line, each of the first equipment and the second equipment is provided with a bridging unit which bridges the working line and the protection line on the transmission side; a switch for selecting the working line or the protection line on the reception side; and a control means provided with a K-byte generating function for generating byte information containing information for realizing the APS; a function of receiving the K-byte information from the protection line, analyzing the received information, placing the prescribed information in the K-byte, and thereby realizing the APS; and a function of changing over the switch.

Due to this, an APS system for an ATM exchange network with which the reliability with respect to a line failure of the ATM exchange network can be improved can be provided.

In this case, the K-byte is composed of the K1 byte and K2 byte, the K1 byte includes the request type information and channel information, and the K2 byte includes the channel information and operation mode information, so the APS can be reliably performed.

Further, as the line termination units (individual parts) for terminating the lines respectively provided in the first and second equipments, OC3c or OC12c or DS3 is used.

Due to such a configuration, information can be transferred at a high speed.

Further, where a plurality of individual parts described before exist, the combination of the working line and the protection line may be fixedly assigned by pairing two of these individual parts.

Due to such a configuration, the design of the system can be facilitated.

Alternatively, where a plurality of individual parts described above exist, the combination of the working line and the protection line may be freely set by pairing two of these individual parts.

Due to such a configuration, the combination of the individual parts can be made variable in accordance with the request of the office.

Further, a software controlled command is externally set in the request type information region in the K1 byte.

Due to such a configuration, the firmware can autonomously perform the APS.

Further, where the switching control between each active side and standby side of the working line and the protection line is performed, the K1 byte and the K2 byte are compared and a certain bridge switch request is issued to an opposing side. In response to this, the K2 byte indicating the bridge completion returns. When the channel number (channel information) in that transmitted K1 byte and the channel number in the received K2 byte match, the APS is autonomously performed by the hardware performing the switching.

By adopting such a sequence, reliable APS in the ATM exchange network can be executed.

Further, in a case where the first and second equipments 10 are respectively constituted by a plurality of individual parts and a common part connected to these individual parts, when notification is received of a failure at cross connections between the individual parts supervised by the common part, the control means rewrites the contents of the K1 byte and the K2 byte and can switch the line between the active side and the standby side.

By adopting such a configuration, the active side and the standby side can be reliably switched.

Further, when the APS failure is restored, the control means detecting the restoration of the failure can rewrite the channel information in the K1 byte and the K2 byte and autonomously switch back from the protection line to the working line by hardware.

By adopting such a configuration, the switch back after the restoration of failure can be reliably performed.

Further, when the APS failure is restored, a software controlled command is externally given to the control means, the request-type information in the K1 byte is rewritten, and thereby it is also possible to perform autonomous switch back from the P-line to the W-line by software.

By adopting such a configuration, the switch back after the restoration of the failure can be reliably performed.

Further, it is possible for the control means not to send a notification of bridge completion for a channel number since a bridge has not been formed with respect to the individual part out of service in the case of a 1+1 bidirectional mode.

By adopting such a configuration, the individual part out of service is disconnected from the system, and the reliability of the operation of the system can be enhanced.

Further, in the connection between a remote office and host office in a case where the first equipment is the remote office and the second equipment is the host office, the characteristic feature resides in that the up highway signaling cell (in-office cell) discrimination bits from the individual part in the remote office are made ON. Those bits are made OFF by a virtual channel controller provided in the host office.

By adopting such a configuration, the control means in the host office can differentiate the user cells and the signaling cells communicated between the host office and the remote office.

Further, at the initialization of the host office and the remote office, first, the APS is started up on the remote side, next the host side is started up, then the VPI/VCI value of each individual part in the host office and the remote office is set to a different value for every individual part. Here, the virtual channel controller is provided with a table storing the VPI/VCI value for every individual part.

By adopting such a sequence, the host office and the remote office can be reliably initialized.

Further, when setting up APS for a common part in the host office, a command for setting a duplex is given from the operating system to the common part, the tag C of the demultiplexer is restored to a fixed value (default value) for the unit, and the thereby the I/O is duplexed. Further, it is possible to determine the ACT side of the individual parts, set up the duplex system for the individual parts, and designate the W-line and P-line.

By adopting such a sequence, the APS can be reliably set up for the common part in the host office.

Further, when setting up APS for the common part in a remote office, the command for setting the duplex is given from the operating system to the common part and the duplex system for the individual parts is set up. Further, the tag C of the demultiplexer can be multidropped.

By adopting such a sequence, the APS can be reliably set for the common part in the remote office.

Further, in order to restore the APS state at the time of restoration from a duplexing failure at the common part, the content of the message of the APS set request (APS-SET-RQ) can be determined as follows in accordance with the timing of transmission of that request:

<1> The APS information in the message is established for the reception side of the message.

<2> The reception side of the message sets the APS information of the other side (#1) at the home side (#0).

<3> The message is set for both sides.

By adopting such a sequence, even if a duplexing failure occurs at the common part, the APS can be reliably established.

Further, when the standby side is taken out of service, the working line is switched to the protection line by the forced switch (Forced SW) command. Further, "lockout of protection" can be set for the protection line.

By adopting such a sequence, the standby side can be reliably placed out-of-service.

Further, when the both sides (ACT, SBY) are to be placed out-of-service, the following procedures can be performed:

<1> A "lockout of protection" is established.

<2> The protection line is placed out-of-service.

<3> The working line is placed out-of-service.

By adopting such a sequence, the both sides can be reliably placed out-of-service.

Further, when the out-of-service states of the both sides are to be released, the following procedures can be performed:

<1> The out-of-service state of the working line is released.

<2> The out-of-service state of the protection line is released.

By adopting such a sequence, the out-of-service states of the both sides can be reliably released.

Further, where the both sides of the common part fail in a state where the individual parts are placed out-of-service, the control means holds the out-of-service state by the software. Then, when the failure of the common part is restored, the out-of-service state of the individual parts can be notified by the APS start notification (command from an operator).

By adopting such a configuration, the failure can be reliably restored.

Further, a plurality of lamps indicating the status are provided in the individual parts. The control means can control the indications of the lamps according to a table defining their statuses.

By adopting such a configuration, the status of the individual parts at the time of APS control can be easily recognized.

In this way, according to the present invention, the reliability of the ATM exchange network with respect to a line failure can be improved and the effect in practical use is great.

We claim:

1. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch.

2. An APS system for an ATM exchange network according to claim 1, wherein said K-byte is composed of a K1 byte and K2 byte, the K1 byte includes request type information and channel information, and the K2 byte includes channel information and operation mode information.

3. An APS system for an ATM exchange network according to claim 1, wherein as a line termination unit (individual part) for terminating the lines respectively provided in said first and second equipments, OC3c or OC12c or DS3 is used.

4. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch;

wherein as a line termination unit (individual part) for terminating the lines respectively provided in said first and second equipments, OC3c or OC12c or DS3 is used; and wherein where a plurality of said individual parts exist, the combination of the working line and the protection line is fixedly assigned by pairing two of these individual parts.

5. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch;

wherein as a line termination unit (individual part) for terminating the lines respectively provided in said first and second equipments, OC3c or OC12c or DS3 is used; and wherein where a plurality of said individual parts exist, the combination of the working line and the protection line is freely set by pairing two of these individual parts.

6. An APS system for an ATM exchange network according to claim 2, wherein a software controlled command is externally set in the request type information region in said K1 byte, and thereby the firmware autonomously performs the APS.

7. An APS system for an ATM exchange network according to claim 2, wherein where the switching control between the active side and standby side of the working line and the protection line is performed, the K1 byte and the K2 byte are compared and a certain bridge switch request is issued to an opposing side, and when the K2 byte indicating the bridge completion returns in response to this, and the channel number in the transmitted K1 byte and the channel number in the received K2 byte match, the APS is autonomously performed by hardware performing the switching.

8. An APS system for an ATM exchange network according to claim 2, wherein where said first and second equipments are respectively constituted by a plurality of individual parts and a common part connected to these individual parts, when a failure at cross connections between the individual parts supervised by said common part is informed, said control means rewrites the contents of the K1 byte and the K2 byte and performs the switching of the line between the active side and the standby side.

9. An APS system for an ATM exchange network according to claim 2, wherein when an APS failure is restored, said control means detecting the restoration of the failure rewrites the channel information in the K1 byte and the K2 byte and autonomously switches back from the protection line to the working line by the hardware.

10. An APS system for an ATM exchange network according to claim 2, wherein when an APS failure is restored, the software controlled command is externally given to said control means, and the request-type information in the K1 byte is rewritten, whereby the autonomous switch back is made from the protection line to the working line by software.

11. An APS system for an ATM exchange network according to claim 1, wherein said control means regards that a bridge has not been formed with respect to an individual part out of service in the case of a 1+1 bidirectional mode and does not send a message of bridge completion concerning the channel number.

12. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch; and wherein, in the connection between the remote office and the host office in a case where said first equipment is the remote office and the second equipment is the host office, up highway signaling cell (in-office cell) discrimination bits from the individual part in the remote office are made ON and those bits are made OFF by a virtual channel controller (VCC) provided in the host office, thereby to differentiate the user cells and the signaling cells between the host office and the remote office.

13. An APS system for an ATM exchange network according to claim 12, wherein:

at the initialization of said host office and remote office, first, the APS is started on the remote side, next the host side is started and then, as the VPI/VCI value of each individual part in the host office and the remote office, a different value is set for every individual part, and in the virtual channel controller, a table storing the VPI/VCI value for every individual part is provided.

14. An APS system for an ATM exchange network according to claim 12, wherein, when establishing the APS with respect to the common part in the host office, a command for setting the duplex state is given from the operating system to the common part, the tag C of the demultiplexer is restored to a fixed value for the unit, the I/O is duplexed, the active side of the individual part is determined, the individual parts are duplexed, and either the working line or the protection line is designated.

15. An APS system for an ATM exchange network according to claim 12, wherein when establishing the APS with respect to the common part in the remote office, the command for setting the duplex state is given from the operating system to the common part, the individual parts are duplexed, and the tag C of the demultiplexer is multidropped.

16. An APS system for an ATM exchange network according to claim 14, wherein in order to restore the APS state at the time of restoration from a duplexing failure at the common part, the message contents of the APS set request (APS-SET-RQ) are determined as follows in accordance with the timing of transmission of that request:

<1> The APS information in the message is established for the reception side of the message, <2> The reception side of the message sets the APS information of the other side at the home side, <3> The message is set for both sides.

17. An APS system for an ATM exchange network according to claim 15, wherein in order to restore the APS state at the time of restoration from a duplexing failure at the common part, the message contents of the APS set request (APS-SET-RQ) are determined as follows in accordance with the timing of transmission of that request:

<1> The APS information in the message is established for the reception side of the message, <2> The reception side of the message sets the APS information of the other side at the home side, <3> The message is set for both sides.

18. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch; and wherein when the standby side is placed out-of-service, for the working line, the protection line is switched to by a forced switch command, and, for the protection line, the "lockout of protection" state is set.

19. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch; and wherein when the both sides (ACT, SBY) are to be placed out-of-service, the following procedures can be performed:

<1> A "lockout of protection" is established,

<2> The protection line is placed out-of-service,

<3> The working line is placed out-of-service.

20. An APS system for an ATM exchange network according to claim 19, wherein, when the both sides release the out-of-service state, the following procedures are performed:

<1> the out-of-service state of the working line is released and

<2> the out-of-service state of the protection line is released.

21. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch; and wherein said K-byte is composed of a K1 byte and K2 byte, the K1 byte includes request type information and channel information, and the K2 byte includes channel information and operation mode information; and wherein where said first and second equipments are respectively constituted by a plurality of individual parts and a common part connected to these individual parts, when a failure at cross connections between the individual parts supervised by said common part is informed, said control means rewrites the contents of the K1 byte and the K2 byte and performs the switching of the line between the active side and the standby side; and wherein where the two sides of the common part fail under a state where the individual parts are taken out of service, the control means holds the out-of-service state by the software, and when the failure of the common part is restored, the out-of-service state of the individual parts is notified by the APS start notification.

22. An APS system for an ATM exchange network in which a first equipment and a second equipment are connected by a duplex communication line comprising a working line and a protection line, wherein each of the first equipment and second equipment is provided with a bridging unit for bridging the working line and the protection line at their transmission sides;

a switch for selecting the working line or the protection line at their reception sides; and a control means provided with a K-byte generating function for generating byte information containing information for realizing the automatic protection switching (APS); a function for receiving the K-byte information from the protection line, analyzing the received information, placing the prescribed information in the K-byte, and thereby realizing the APS; and a function for changing over the switch;

wherein said K-byte is composed of a K1 byte and K2 byte, the K1 byte includes request type information and channel information, and the K2 byte includes channel information and operation mode information; and wherein where said first and second equipments are respectively constituted by a plurality of individual parts and a common part connected to these individual parts, when a failure at cross connections between the individual parts supervised by said common part is informed, said control means rewrites the contents of the K1 byte and the K2 byte and performs the switching of the line between the active side and the standby side; and wherein a plurality of lamps indicating status are provided in said individual parts and said control means controls the indication of said lamps according to the table of defining the respective statuses.

* * * * *